(12) United States Patent
Tari et al.

(10) Patent No.: US 6,704,295 B1
(45) Date of Patent: Mar. 9, 2004

(54) RADIO COMMUNICATION SYSTEM FOR PUSH INFORMATION DELIVERY

(75) Inventors: Kazuyoshi Tari, Omiya (JP); Hirokazu Unoki, Omiya (JP); Tumoru Nagira, Omiya (JP)

(73) Assignee: Mitsubishi Materials Corporation, Tokyo (JP)

( * ) Notice: Subject to any disclaimer, the term of this patent is extended or adjusted under 35 U.S.C. 154(b) by 0 days.

(21) Appl. No.: 09/581,260

(22) PCT Filed: Oct. 28, 1999

(86) PCT No.: PCT/JP99/05957

§ 371 (c)(1),
(2), (4) Date: Jun. 27, 2000

(87) PCT Pub. No.: WO00/27080

PCT Pub. Date: May 11, 2000

(30) Foreign Application Priority Data

| Oct. 29, 1998 | (JP) | 10-309229 |
| Oct. 29, 1998 | (JP) | 10-309230 |
| Oct. 29, 1998 | (JP) | 10-309232 |
| Nov. 16, 1998 | (JP) | 10-325699 |

(51) Int. Cl.[7] ............................................. H04L 12/16
(52) U.S. Cl. ...................... 370/270; 370/312; 370/313; 370/328; 370/389; 370/400
(58) Field of Search ................................ 370/270, 312, 370/313, 328, 338, 389, 392, 400, 432, 471, 486, 487

(56) References Cited

U.S. PATENT DOCUMENTS

| 6,208,656 | B1 | * | 3/2001  | Hrastar et al. | 370/401 |
| 6,295,291 | B1 | * | 9/2001  | Larkins | 370/329 |
| 6,308,329 | B1 | * | 10/2001 | Takahashi | 725/153 |
| 6,484,028 | B2 | * | 11/2002 | Okada et al. | 370/395.31 |
| 6,628,625 | B1 | * | 9/2003  | Birdwell et al. | 370/270 |

* cited by examiner

*Primary Examiner*—Chi Pham
*Assistant Examiner*—Anh-Vu H Ly
(74) *Attorney, Agent, or Firm*—Oblon, Spivak, McClelland, Maier & Neustadt, P.C.

(57) ABSTRACT

To realize real-time information distribution and a server that reliably delivers information to a mobile terminal and a push-type control method for an information monitoring device.

The push-type function server of this invention accumulates information to be distributed and identifier information of destination terminal devices; obtains address information of a terminal device from a home radio server that manages the terminal device according to the identifier information, and transfers distributed information to a radio server connected to a destination terminal device based on the address information, and the information monitoring device monitors whether or not data to be distributed to a specified terminal device have been delivered to other information-storing severs.

20 Claims, 15 Drawing Sheets

ADDRESS CONVERSION TABLE

| IP ADDRESS UNDER HOME SERVER | PORT NUMBER | IP ADDRESS UNDER ANOTHER RADIO SERVER FOR ANOTHER DISTRICT | IDENTIFIER NUMBER |
|---|---|---|---|
| 172.20.10.1 | 53 | 172.20.10.1 | — |
| 172.20.10.2 | 80 | 172.10.10.2 | — |
| 172.20.10.3 | 21 | 172.10.10.3 | — |
| 172.20.10.100 | — | 172.10.10.100 | 111 |

FIG. 15

(a) (HOST SERVER)

START → SEND AN ASSIGNMENT REQUEST SIGNAL TO A LAN SERVER (Sa1) → SEND DATA TO THE INTERNET IP ADDRESS ACQUIRED FROM THE LAN SERVER (Sa2) → END

(b) (LAN SERVER)

START → ANALYZE RECEIVED DATA (Sb1) → IS THE RECEIVED DATA AN ASSIGNMENT REQUEST SIGNAL? (Sb2)

- YES (Sb3) → ASSIGN AN INTERNET IP ADDRESS TO A CLIENT REQUESTED TO BE ASSIGNED AN INTERNET IP ADDRESS AND PRODUCE AN ADDRESS CONVERSION TABLE → NOTIFY THE SENDER OF THE ASSIGNMENT REQUEST SIGNAL OF THE INTERNET IP ADDRESS ASSIGNED TO THE CLIENT (Sb4) → END
- NO → REFER TO THE ADDRESS CONVERSION TABLE AND CONVERT THE DESTINATION INTERNET IP ADDRESS OF THE RECEIVED DATA TO THE CORRESPONDING LOCAL IP ADDRESS (Sb5) → TRANSFER THE RECEIVED DATA TO THE RESULTANT LOCAL IP ADDRESS (Sb6) → END

(c) (CLIENT)

START → RECEIVE DATA (Sc1) → END

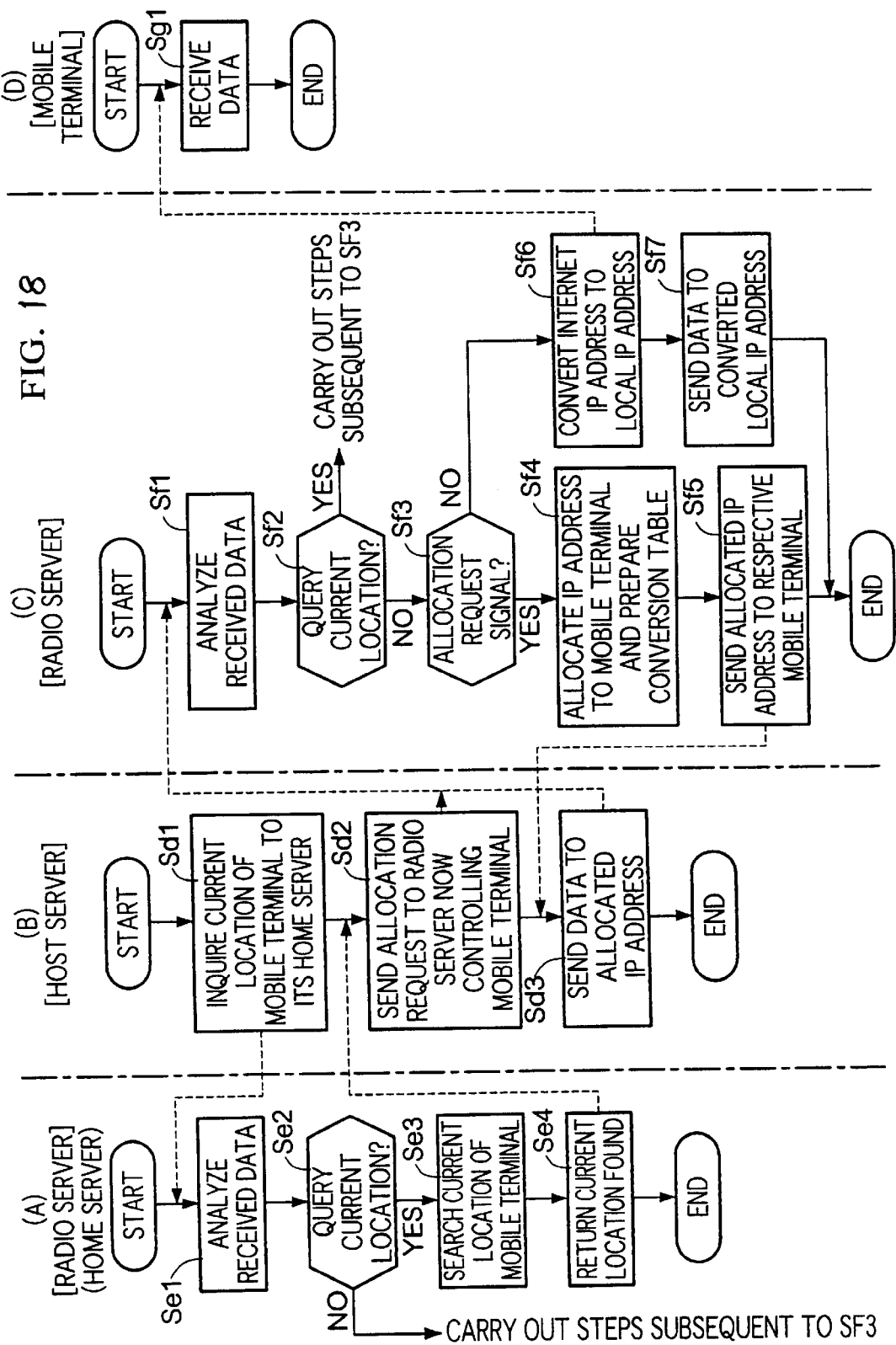

RADIO COMMUNICATION SYSTEM FOR PUSH INFORMATION DELIVERY

TECHNOLOGICAL FIELD

This invention relates to a network-based radio communication system such as the Internet, and provides an apparatus that can be connected to the Internet by radio signals and having a processing sequence for distributing push-type information to mobile terminals and a method for control of such a system.

TECHNOLOGICAL BACKGROUND

In recent years, Internet-based push-type information distribution services are being provided. Such a push-type information distribution is meant to automatically deliver information at certain times from the host side to terminal devices as clients, but, in reality, the terminal device collects information from the host by requesting delivery of information at specific times. That is, in practice, the delivery method is operated not as a push-type control but as a pull-type control.

In the meantime, needs for mobile computing are increasing and contact to the Internet is currently carried out from the mobile terminal device. In mobile computing, a computer is connected to the Internet to exchange data using telephone network and the like. Because the transmission network is mobile telephone networks, it presents a feature that communication is possible from non-stationary locations such as automobiles and the like.

In order to distribute emergency information in real-time using such a pseudo push-type control that is in fact a pull-type control, it is necessary to output information delivery requests to the host at short intervals. When such information delivery requests are output to the host at short intervals, it leads to increase in the network traffic volume.

Also, when the client is a mobile terminal that can move to a different network for connection, it is necessary that the information delivered to the server managing this mobile terminal be reliably delivered to the server being connected to the mobile terminal.

Also, there is broadcasting service that simultaneously distributes identical information to all the devices connected to the network. The broadcasting service is not required to specify the addresses of each receiving device, and therefore, it is often used in the case of distributing important information to all devices simultaneously.

Although delivery of information by broadcasting can provide information from one device to many devices simultaneously, as far as the terminal receiving the information is concerned, there are times when all information broadcast are not needed by every terminal. For example, there is no need for the general public to receive information aimed at police and fire department during some disaster. However, police and fire departments should be aware of the information issued to general public. It is therefore preferable that broadcast information be distributed or received only by those needing the information.

However, because the conventional broadcasting technology can only distribute identical information simultaneously, there is a problem that it can not deliver the necessary information to people in need of that information. Also, there is a problem that, to deliver information needed only by the receiver, the conventional technology must individually deliver pieces of information.

Also, a client connected to a local area network (LAN), for example, is provided with an IP address defined within the LAN (referred to as a local IP address hereinafter). When this client is to communicate with a host server (referred to as an external server hereinafter) connected to the Internet, for example, this client must communicate using a global IP address.

In this case, if a client operating within a LAN that does not have an Internet IP address wishes to contact an external host, conventionally, when the external host receives such a request from the client, a router and the like having a network address translation (NAT) function selects a suitable IP address from a number of Internet IP addresses that are already under its management, and appropriately allocates this address to the client.

Then, in the case of sending data from the client to the external host, the router having a NAT function converts the originator's IP address of data to an Internet IP address allocated from the local addresses of the clients, and, in the case of receiving data from the external host to be sent to the client, the sent IP address (that is, IP address allocated to the client) is converted to the client's local address, to establish communication between the LAN clients and the external host.

However, in recent years, as mentioned earlier, push-type information distribution service is becoming available. But, it has not been possible to provide the push-type service to those clients operating with a LAN using the conventional technology.

This is because, in the case of a router with the NAT function, for example, because IP addresses are allocated in response to client access requests, it has not been possible to allocate Internet IP addresses to clients operating within a LAN in response to access request from the external host.

Also, in mobile computing, in the conventional communication devices, because the communication protocol is based on fixed communication devices, there is a problem that mobile devices cannot communicate by moving between the networks. Also, because telephone networks are used, there are problems that it takes some time for obtaining a connection and that access may not be possible when the line is being used by many users.

And, another problem is that when a terminal device moves from one site to another, addresses and other parameters of a server to be accessed may be different. The settings for a server that can be accessed by a mobile terminal are fixed in the individual terminals. When the mobile terminal moves in another network and use another servers, the existing settings of the terminal cannot be used.

DISCLOSURE OF THE INVENTION

Therefore, an object of this invention is to provide a radio communication system to reliably enable real-time distribution of push-type information to a mobile terminal device.

The object has been achieved in a push-type function server operating in a radio communication system comprised by a plurality of radio servers connectable to the Internet; at least one type of a function server connectable to the Internet; a base station radio connected to a radio server for radio communication with the server; a mobile radio for radio communication with the base station radio; and a terminal device connected to the mobile radio; so that the terminal device can connect to the Internet by radio communication with the mobile radio within a district managed by the base station radio connected to the radio server; wherein the push-type function radio server is comprised by:

an information accumulation section for storing information to be distributed to the terminal device, an identifier information for identifying the terminal device and a processing section; wherein the processing section is comprised by:
  a mobile address information acquiring section for obtaining address information of a mobile radio connected to a destination terminal device from a home radio server that manages the mobile radio according to the identifier information; and
  an information distribution section for distributing information to the radio server connected to the destination terminal device according to the address information.

Also, this invention enables the object to be achieved by providing a method for push-type control of the push-type function server according to claim 1, to perform the steps of:
  acquiring address information of a mobile radio connected to a destination terminal device from a radio server that manages the mobile radio, based on the identifier information; and
  transferring distribution information to a radio server connected to the destination terminal device according to the address information.

Also, this invention enables to achieve the object by recording the push-type control method disclosed in claim 16 on a computer-readable recording medium and installing the program into computer means so as to execute the prescribed steps.

As described above, according to this invention, address information of a mobile radio connected to a destination terminal device can be obtained from a home radio server that manages the mobile radio, by referring to the identifier information for destination terminal devices accumulated in the information accumulation section of the push-type function server, so that, based on the acquired address information, information to be distributed is transferred to a radio server connected to the destination terminal device. For this reason, even if the mobile radio and the terminal device connected to the mobile radio move to an operating district managed by a different radio server, the required information can reliably be delivered to the destination terminal device.

Additionally, according to this invention, the object is achieved by an information monitoring device operating in a radio communication system comprised by a plurality of radio servers connectable to the Internet; at least one type of a function server connectable to the Internet; a base station radio connected to a radio server for radio communication with the server; a mobile radio for radio communication with the base station radio; and a terminal device connected to the mobile radio; so that the terminal device can connect to the Internet by radio communication with the mobile radio within a district managed by the base station radio connected to the radio server; wherein the information monitoring device is comprised by:
  an information monitoring section for detecting changes in information accumulated in other function servers; and
  an information transfer section for sending a new piece of information in the accumulated information to the push-type function server according to claim 1.

Also, according to this invention, the object can be achieved by providing a method for push-type control of the information monitoring device according to claim 3, to perform the steps of:
  detecting changes in information accumulated in other function servers;
  building information to be transferred in accordance with the volume/content of the information; and
  transferring the built information.

Also, this invention enables to achieve the object by recording the push-type control method for the information monitoring device disclosed in claim 3 on a computer-readable recording medium and installing the program into computer means so as to execute the prescribed steps.

As described above, according to this invention, because the system is designed so as to detect changes in information accumulated in other function servers and the differential information is sent to the push-type server, newly arriving information can be sent immediately to any destination terminal.

BRIEF DESCRIPTION OF DRAWINGS

FIG. 15 is a flowchart showing the operation of various sections for performing the push type information distribution service in the communication network system.

FIG. 18 is a flowchart showing the operation of the various sections for performing the push type information distribution service in the radio communication network system.

PREFERRED EMBODIMENTS OF THE INVENTION

In the following, preferred embodiments of the present invention will be presented with reference to the drawings.

Figure 2:
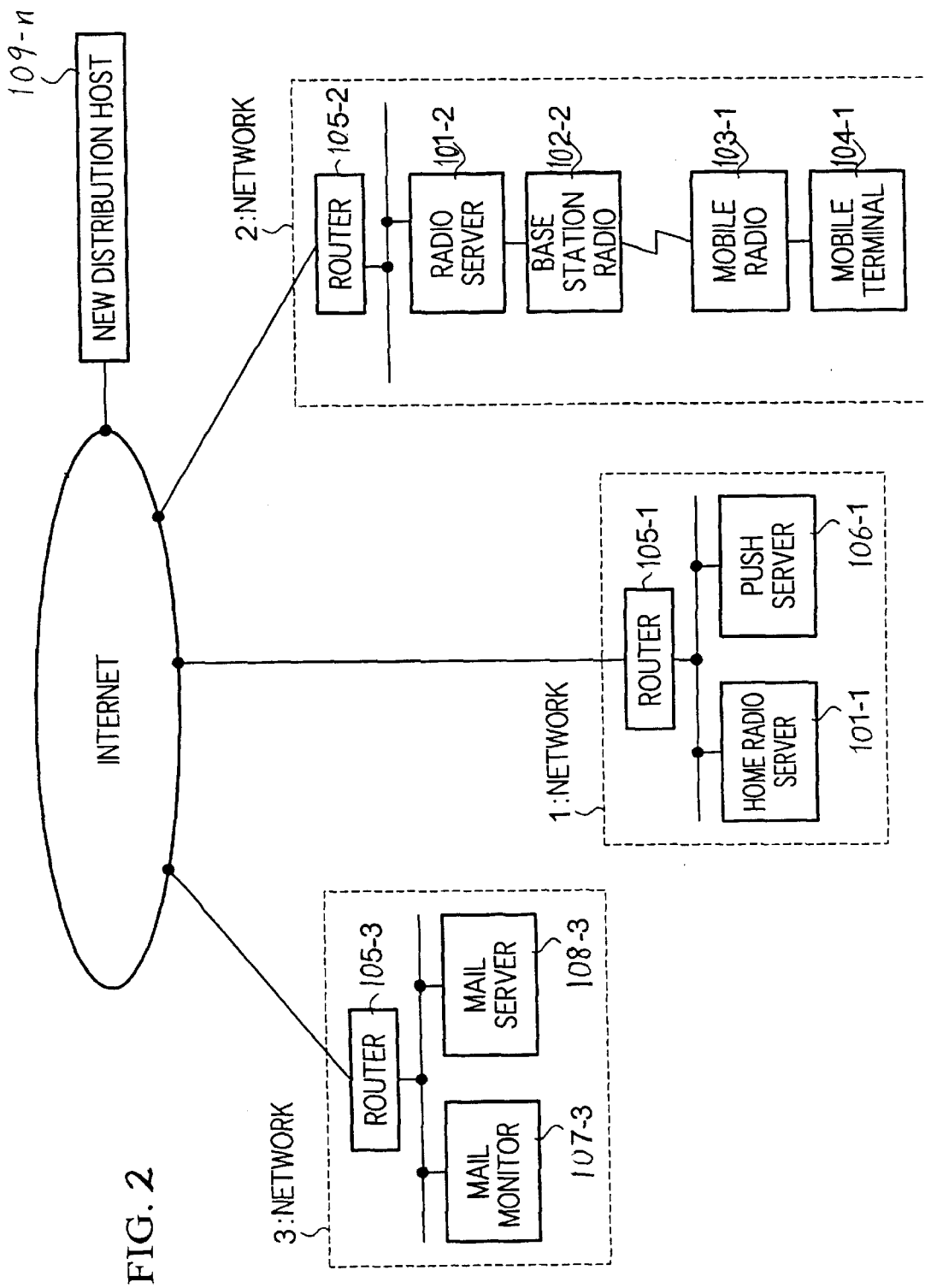
FIG. 2 is a diagram showing an application example of the push function server and mail monitor.

FIG. 2 shows an application example based on a push function server 106-n in Embodiment 1 and a mail monitor 107-n in Embodiment 2 of the present invention. In this application example, three networks n (n=1~3) are connected to the Internet through routers 105-n (n=1~3). A home radio server 101-1 and the push function server 106-1 are connected to the network 1. A radio base station 102-2 is connected to the radio server 101-2, and a mobile terminal 104-1 is connected to a mobile radio 103-1, which communicates with the radio server 101-2 through the radio base station 102-2 by radio communication. Also, a mail monitor 107-3 and a mail server 108-3 are connected to the network 3. Here, the radio server 101-n (n=1, 2, . . . ) serves a specific mobile radio 103-n (n=1, 2, . . . ) and mobile terminal 104-n (n=1, 2, . . . ). The radio server 101-n (n=1, 2, . . . ) that manages the mobile radio 103-n (n=1, 2, . . . ) and mobile terminal 104-n (n=1, 2, . . . ) is referred to, in particular, as the home radio server from the standpoint of these devices.

Here, the mobile terminal 104-n is comprised by personal computer and dedicated terminals and the like.

FIG. 2 shows a case in which the mobile terminal 104-1 under the control of home radio server 101-1 that belonging to network 1 has moved to the operating district of the network 2, and is connected to the radio server 101-2 that belongs to network 2. In this application example, three networks are shown, but the number of networks that can be serviced in this invention is not limited, and the number and types of devices that can be connected to the networks (n=1, 2, . . . ) are not limited. Also, function server is a general term assigned to a server that includes devices such as mail server and news server that fulfill specific functions.

Figure 1:
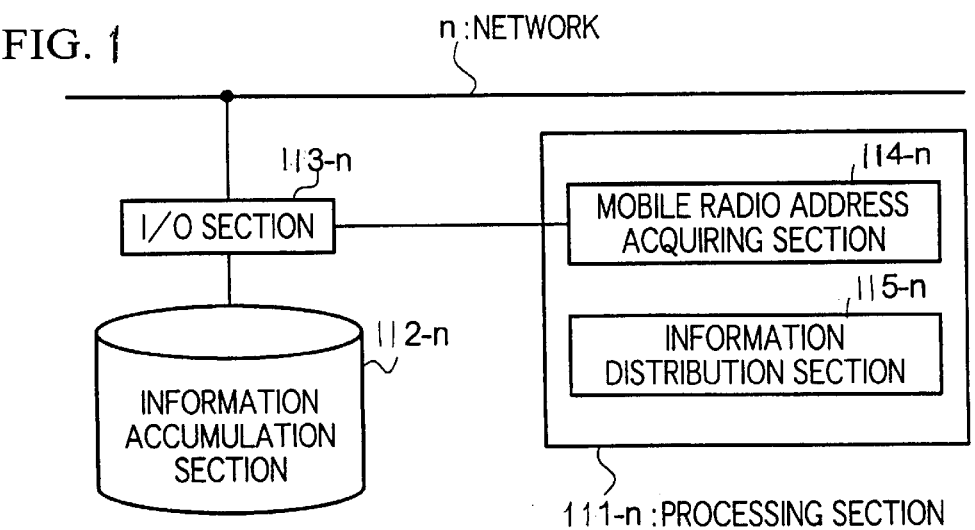
FIG. 1 is a block diagram of the structure of a push function server (push-type function server) in Embodiment 1.

FIG. 1 is a block diagram of a structure of the push function server 106-n in Embodiment 1. In this embodiment, explanations relate to the case in which a plurality of networks n (n=1, 2, . . . ) are connected to the Internet for its use. It should also be noted that the communication protocol is not necessary to be limited to TCP/IP.

The push function server 106-n in this embodiment is comprised by: a processing section 111-n having a mobile radio address acquiring section 114-n and an information distribution section 115-n; an information accumulation section 112-n for storing identifier information for the mobile terminal 104-n to which data should be directed and information to be distributed; and an input/output (I/O) section 113-n (n=1, 2, . . . ) connected to the network for exchanging data. The identifier information may include: (1) a combination of the subscriber group number, mobile radio number, terminal IP address, or (2) a combination of the subscriber group number and mobile radio number, or (3) a combination of the subscriber group number and terminal IP address. Here, a plurality of mobile radios 103-n may be registered to one subscriber group, and a plurality of mobile terminals 104-n may be connected to one mobile radio 103-n.

When the identity data (1) and (3) are used, it is possible to specify a mobile terminal 104-n and a mobile radio 103-n to which the mobile terminal 104-n is connected. Therefore, information can be delivered reliably to the intended receiver, which is the mobile terminal 104-n. When identity data (2) are used, it is possible to specify a mobile radio 103-n to which a mobile terminal 104-n is connected, but it is not possible to specify the mobile terminal 104-n. In this case, the intended information can be delivered to the mobile terminal 104-n by broadcasting the information to all the mobile terminals 104-n (when there are many mobile terminals). When one mobile radio 103-n corresponds to one mobile terminal 104-n, then it is possible to deliver the information to the mobile terminal 104-n only.

Here, the mobile radio address acquisition section 114-n functions as the mobile address acquisition section-described in the range of the claims.

The processing section 111-n is comprised by a memory section and a central processing unit (CPU) and others, and operates by loading application programs (not shown) in the memory to carry out the various functions provided in the processing section 111-n. Also, the information accumulation section 112-n is comprised by non-volatile recording devices such as hard discs and opto-magnetic discs.

Figure 3:
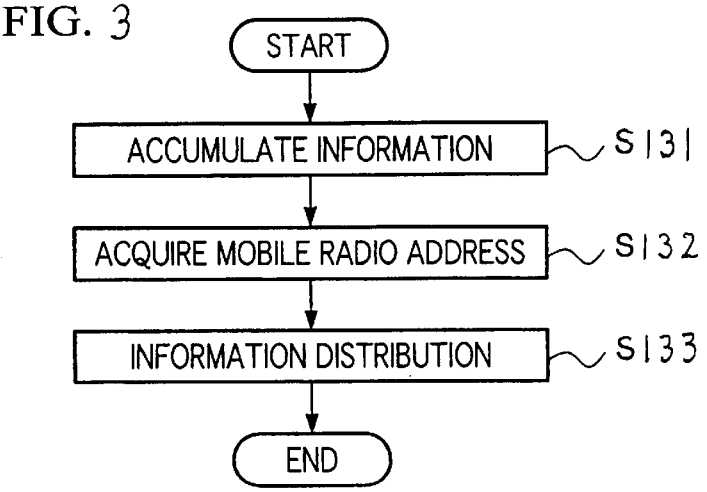
FIG. 3 is an operational flowchart of the push function server.

Next, the operation of the push server 106-n of such a structure will be explained with reference to the flowchart shown in FIG. 3.

First, information to be delivered to the mobile terminal 104-n sent from a function server (mail sending host, news distribution host and the like) and identifier information of the mobile terminal 104-n (a combination of subscriber group number, mobile radio number, terminal IP address, or a combination of subscriber group number and mobile radio number, or a combination of subscriber group number and terminal IP address) is accumulated in the information accumulation section 112-n (step S131).

Next, the mobile radio 103-n connected to the IP address of the mobile terminal 104-n makes an inquiry to the home radio server 101-n through the mobile radio address acquisition section 114-n in order to specify the currently-connected radio server 101-n'. In response, the push server 106-n sends identifier information for the mobile terminal 104-n. Then, an IP address of the mobile radio 103-n is obtained from the home radio server 101-n (step S132). Here, the push server 106-n is paired with the home radio server 101-n and is able to exchange information with each other.

Also, the home radio server 101-n has a table relating the IP addresses of the mobile radio 103-n and the mobile terminal 104-n and identifier information of the receiving mobile terminal 104-n sent from the push server 106-n. And, the radio server 101-n', at the stage of registration confirmation for the mobile terminal 104-n, notifies the IP address of the mobile radio 103-n to the home radio server 101-n, and the home radio server 101-n renews the table containing the IP address of the mobile radio 103-n and retains the renewed data. Then, when the push server 106-n requests the IP address of the mobile terminal 104-n, the IP address based on the table is returned.

Next, the information distribution section 115-n obtains the IP address of the radio server 101-n' from the IP address of the mobile radio 103-n, and sends the information to be delivered to the mobile terminal 104-n and the identifier information to the radio server 101-n' (step S133). The radio server 101-n' is to immediately send this information to the mobile terminal 104-n. However, when the identifier information (1), (3) are used, the radio server 101-n' can identify the receiving mobile terminal 104-n so that the information is delivered directly to the mobile terminal 104-n. When the identifier information (2) is used, the radio server 101-n' broadcasts the information to all the mobile terminals 104-n (when there are many) connected to the mobile radio 103-n.

Here, the network addresses of the mobile radio 103-n connected to the radio server 101-n' and the radio server 101-n are the same, and the host address of the radio server 101-n' is pre-determined, and therefore, IP address of the radio server 101-n' can be readily obtained from the IP address of the mobile radio 103-n. For example, if the IP address of the radio server 101-n' is 172.31.0.254, then the IP address of the mobile radio 103-n will be 172.31.0.1. From the [172.31] portion of the IP address of the mobile radio 103-n, the IP address 17.31.0.254 of the radio server 101-n' can be determined, because [*.*.0.254] is pre-determined as the host address of the radio server.

Therefore, according to this embodiment, information to be delivered to a mobile terminal 104-n can be reliably delivered thereto, even when the mobile terminal 104-n connected to the mobile radio 103-n moves to different operating districts.

Next, the mail monitor (information monitoring device) which represents Embodiment 2 of this invention will be explained with reference to the drawing.

Figure 4:
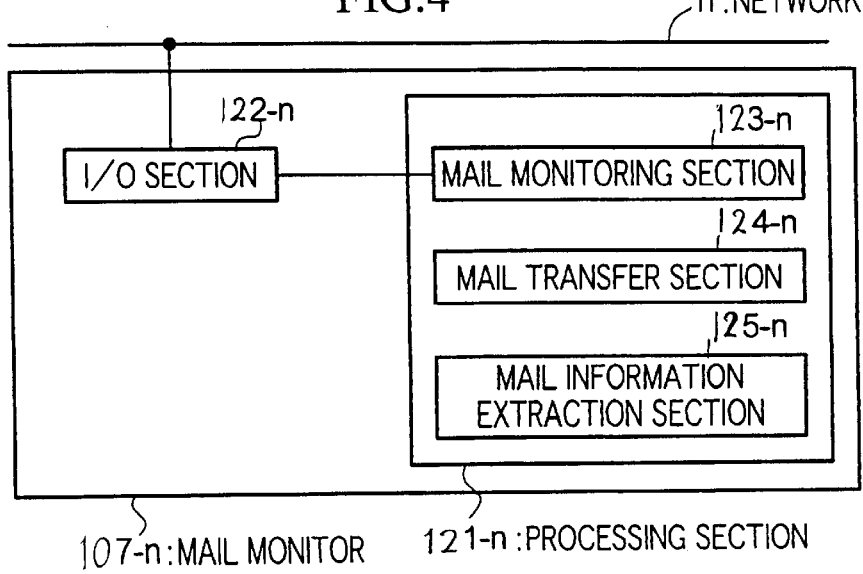
FIG. 4 is a block diagram showing the structure of a mail monitor in Embodiment 2.

FIG. 4 shows a block diagram of the mail monitor 107-n in this embodiment. In this embodiment, it is assumed that a plurality of networks (n=1, 2, . . . ) are connected to the Internet. Also, it is assumed that TCP/IC is used as the communication protocol, but it is not necessary to limit to this protocol only. Also, information to be monitored is e-mails in this embodiment, but it is acceptable to monitor servers other than the mail server 108. Here, the mail monitor 107-n in this embodiment is used in conjunction with the push server 106-n in the previous embodiment.

The mail monitor 107-n in this embodiment is comprised by: a processing section 121-n having a mail monitoring section 123-n, a mail transfer section 124-n, a mail information extraction section 125-n; and an I/O section 122-n connected to the networks n for exchanging data.

The mail monitoring section 123-n periodically accesses the mail server 108-n and checks whether new mails have been received in the account specifying the mail server 108-n. If there is a new mail, it generates an identifier information of the mobile terminal 104-n from its account information (a combination of subscriber group number, mobile radio number, terminal IP address, or a combination of subscriber group number and mobile radio number, or a combination of subscriber group number and terminal IP address). Also, the mail monitor 107-n has a table relating the account information of mails and identifier information of the mobile terminal 104-n, and generates the table according to the contents of the table.

The mail transfer section 124-n transfers identifier information of the receiving mobile terminal 104-n and the new mail to the push server 106-n.

The mail information extraction section 125-n confirms the presence of new mails in the mail server 108-n by the mail monitoring section 123-n, and further confirms the mail volume, size, types of attachments and the like, when the identifier information is generated from its account information. And, it prepares information to be transferred to the push server 106-n according to such information, and forwards them to the mail transfer section 122-n. For example, if the number and volume of mail are high, it selects only the titles of the mails.

Here, it is permissible to integrate the functions of mail monitor 107-n in the mail server 108-n.

Next, the operations of the push server 106-1 in Embodiment 1 shown in FIG. 2, the mail monitor 107-n and other devices will be explained.

The mail sending host 109-n transfers mails including mail addressed to the mobile terminal 104-1 to the mail server 108-3.

The mail monitor 107-3 periodically accesses the mail server 108-3 and checks whether new mails exist. If there is a new mail, it generates identifier information of the receiving mobile terminal 104-n based on its account information. If the new mail is addressed to the mobile terminal 104-1, for example, the mail monitor 107-3 sends the new mail and the identifier information of the mobile terminal 104-1 to the push server 106-1.

The push server 106-1, upon receiving the information to be delivered to the mobile terminal 104-1, which is managed by the home radio server 101-1 belonging to network 1, and the identifier information of the mobile terminal 104-1, it stores the information in the information accumulation section 112-1.

Then, the push server 106-1 accesses the home radio server 101-1, and inquires about the IP address of the mobile radio 103-1, and obtains this information. Then, the push server 106-1 sends the identifier information of the mobile terminal 104-1 to the home radio server 101-1. The home radio server 101-1 references the table containing the addresses of the mobile radio 103-1 and the mobile terminal 104-1, and sends the IP addresses of the mobile radio corresponding to the identifier information to the push server 106-1.

Next, when the identifier information (2) described above is being used, the push server 106-1 sends the information to be forwarded to the mobile terminal 104-1 to the radio server 101-2 using the IP address of the mobile radio 103-1 acquired. When the identifier information (1) or (3) is being used, information to be delivered to the mobile terminal 104-1 and the IP address of the mobile terminal 104-1 are sent.

The radio server 102-2, upon receiving the information to be delivered to the mobile terminal 104-1 and if the IP address of the mobile terminal 104-1 is attached, immediately outputs such information to the mobile radio 103-1, which sends the information to the mobile terminal 104-1. In this case, it is assumed that there is a one-on-one correspondence between the mobile radio 103-1 and the mobile terminal 104-1.

In the above embodiment, there is one each of mobile radio 103-1 and mobile terminal 104-1 under the management of the home radio server 101-1 belonging to network 1, however, it is not necessary to limit the number and a plurality of mobile radios 103-1 and mobile terminals 104-1 may be included, and the processing section 111-1 performs the processing steps describe above for each information to be delivered to the mobile terminal 104-1.

According to this embodiment, because changes in formation stored in other function servers are detected and the difference in the information is sent to the push server 106-1, new information can be delivered immediately to the mobile terminal 104-1.

Furthermore, information to be transferred is formulated depending on the volume and the content of the stored information, and therefore, not only the traffic volume in the communication circuit is reduced but also information that is compatible with the memory capacity and display capability of the mobile terminal 104-1 can be delivered.

Figure 5:
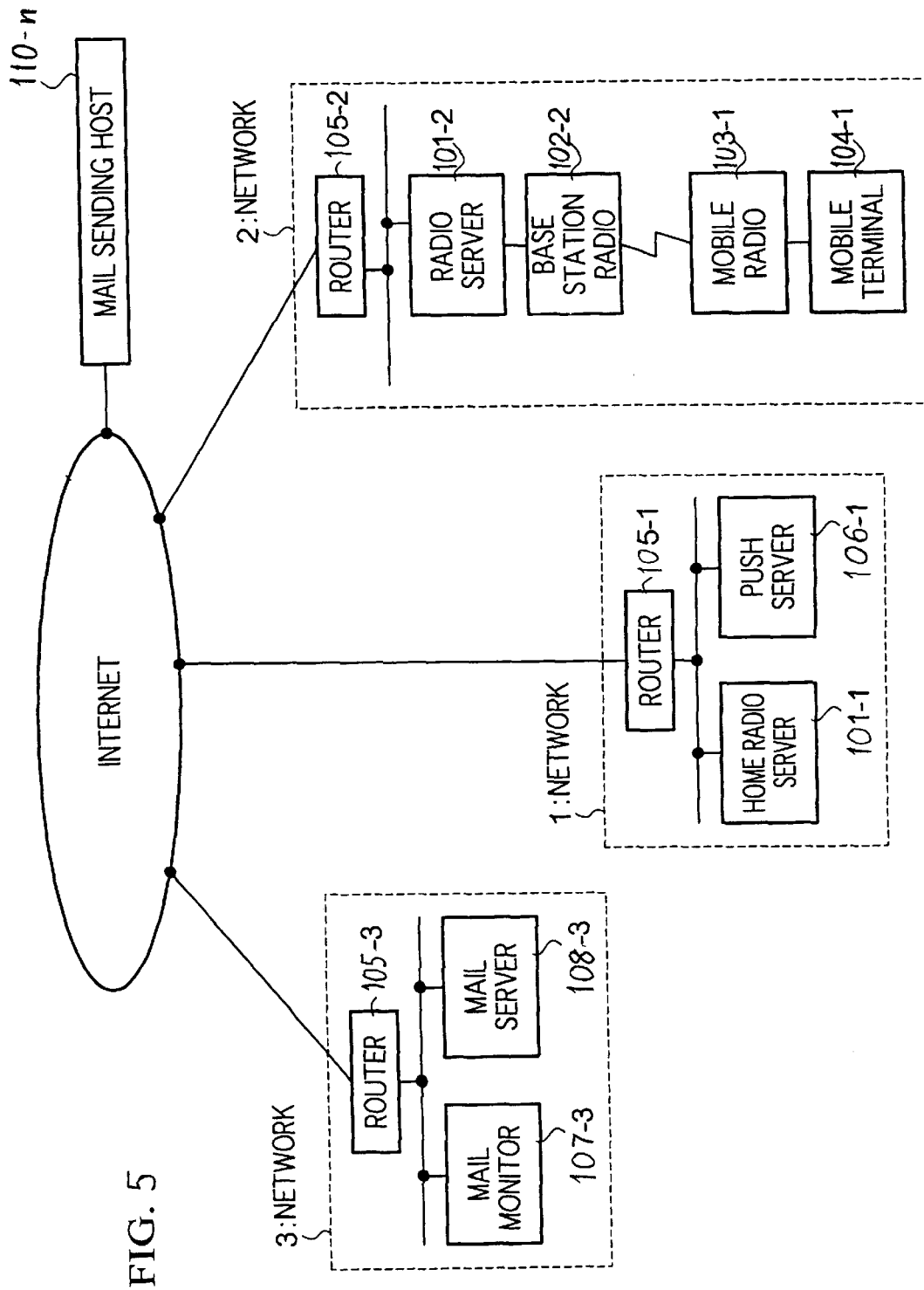
FIG. 5 is a diagram showing a second application example of the push function server.

Next, the operations of the push server 106-1 in Embodiment 2 shown in FIG. 5 and other devices will be explained. In this application example, instead of the mail sending host 109-n, a news distribution host 110-n, as an example, is connected to the Internet. And, the news distribution host 110-n delivers news as distribution information to the mobile terminal 104-1. Here, it is assumed that the news distribution host 110-1 has the IP address of the push server 106-1 and is able to send data directly to the push server 106-1.

First, the news distribution host 110-n sends information such as news and the identifier information of the mobile terminal 104-1 directly to the push server 106-1. Then, the push server 106-1 accumulates such information received in the information accumulation section 112-1. The subsequent steps are the same as those described in Embodiment 1.

In this embodiment, distributed information from the original sender can be immediately sent to the mobile terminal 104-1.

Also, an application program for operating the push server of this invention and the information monitor may be recorded in a computer-readable recording medium, and the recorded programs may be executed by computer means to control the push server and the information monitor.

That is, this program enables the computer means to execute a function to acquire address information from the home radio server that manages the mobile radio connected to the destination terminal device, based on the identifier information accumulated in the information accumulation section, as well as a function to transfer the delivered information to a radio server to which the destination terminal device is connected, according to the address information.

Also, this program enables computer means to execute a function to detect changes in the information accumulated in other function servers (for example, mail server), and a function to prepare information, based on the volume and contents of the information, to be transferred to the push server of this invention.

In the following, a terminal device and a computer server in Embodiment 3 will be explained with reference to the drawings.

Figure 6:
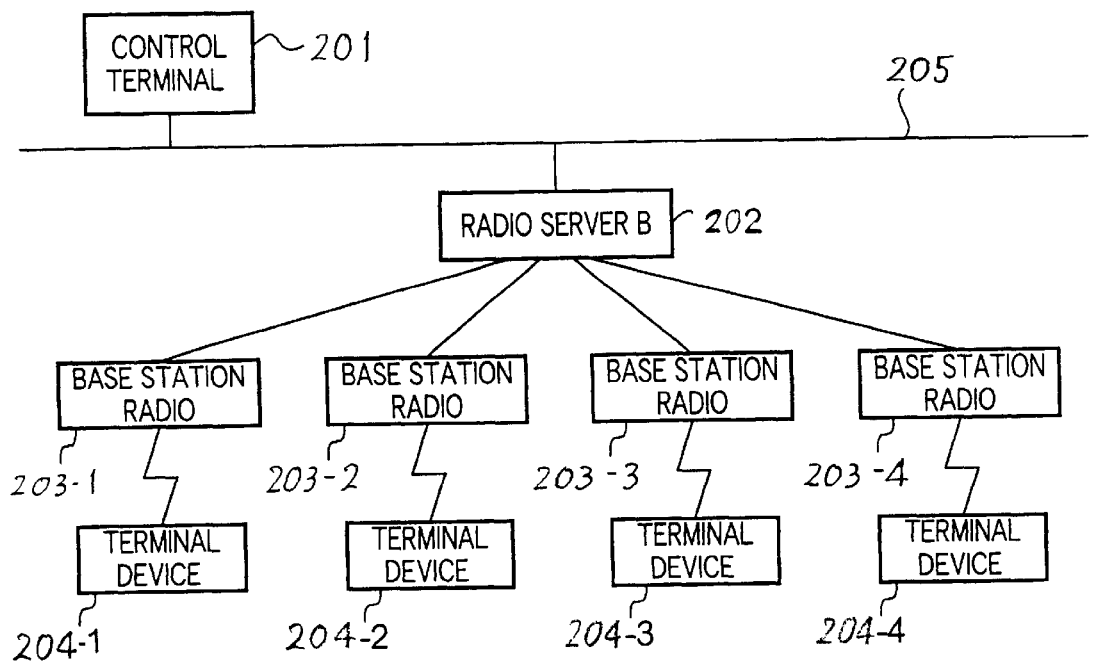
FIG. 6 is a block diagram of the overall structure in Embodiment 3.

FIG. 6 shows a block diagram of the overall radio communication network system in Embodiment 3. In this diagram, the reference numeral 201 relates to a broadcast terminal to build and dispatch information to be broadcast; 202 refers to a computer server (server hereinbelow) connected by a network 205; 203-1~4 are base station radios (base stations hereinbelow) connected to the server 202; 204-1~4 are mobile terminals for establishing radio communications with respective base stations 203-1~4.

Here, four base stations 203-1~4 are shown for one server 202 but more than five base stations may be connected.

Also, one base station 203-1 corresponds to on mobile terminal 204-1, but it is permissible to establish communication to one base station 203 using more than two mobile terminals 204.

Next, the operation to broadcast information from a broadcast terminal 1 will be explained with reference to FIG. 6.

First, the operator prepares broadcast information to be broadcast through the broadcast terminal 1.

Figure 11:
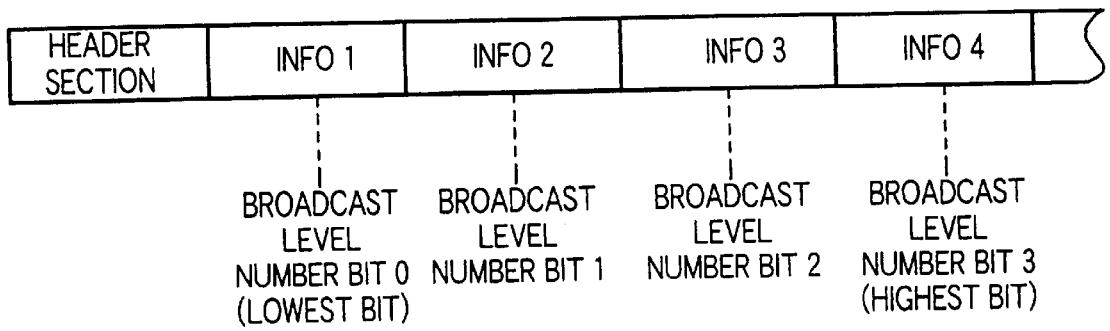
FIG. 11 is a diagram for explaining the format of the broadcasting information.

The format for broadcast information built in this case is shown in FIG. 11. As shown in this diagram, information to be broadcast is comprised by a header section and a plurality of pieces of information. In this case, it is supposed that the information is divided into four sections.

The header section contains an identifier to show that the information is broadcast information, and network addresses for performing broadcasting and succeeding information 1~4 defining the information size.

Also, information succeeding the header section is rarely required in full for the terminals receiving the broadcast information, and therefore, the information is divided into a plurality of broadcast levels categorized by the nature of the receiver. In the example shown in FIG. 11, there are four levels.

Categorized levels indicate the type of receiving terminals, and if an example is used to broadcast information for emergency situations, the levels are: terminals belonging to individuals (level 1); terminals belonging to self-governing bodies (level 2); terminals belonging to fire department (level 7); terminals belonging to police (level 15); and each level is identified by a broadcast level number.

Accordingly, the terminals receiving broadcast information are classified into levels beforehand, and a level number is assigned according to the level (broadcast levels hereinbelow).

The broadcast levels 1~4 are assigned to information using number bits, as shown in FIG. 11, and if the bit is [1], the terminal requires the information. In the example given in FIG. 11, information 1 is assigned to the lowest bit, and the remaining ones are assigned successively and information 4 has the highest bit. In this example, broadcast levels are expressed by 4 bits.

For example, for those terminals requiring only information 1, the lowest bit only is [1], and the level number is [1]. And, if the terminal requires all the information 1~4, all the 4 bits are [1] so that the level number is [15]. If the terminal requires no information, the level number is [0].

Accordingly, when there are four information, 16 levels of classification can be produced between the broadcast level numbers [0] and [15].

Also, when there are many pieces of information, similar level numbers can be produced by increasing the number of bits.

Broadcast information is built so that the information to be broadcast is divided into several groups according to level classification.

Next, broadcast terminal 1 broadcasts information to those terminal specified for broadcasting.

In such a case, broadcast terminal 201 may be comprised by computer means having an I/O device and the like.

Also, broadcast information may be divided for distribution, as shown in FIGS. 12A~12D by providing a header section in individual information 1~4. In such a case, the header section should have an identifier to indicate the contents of the information that follows.

Next, the operation of the server 202 in delivering the broadcast information to mobile terminals 204-1~4 will be explained.

Figure 7:
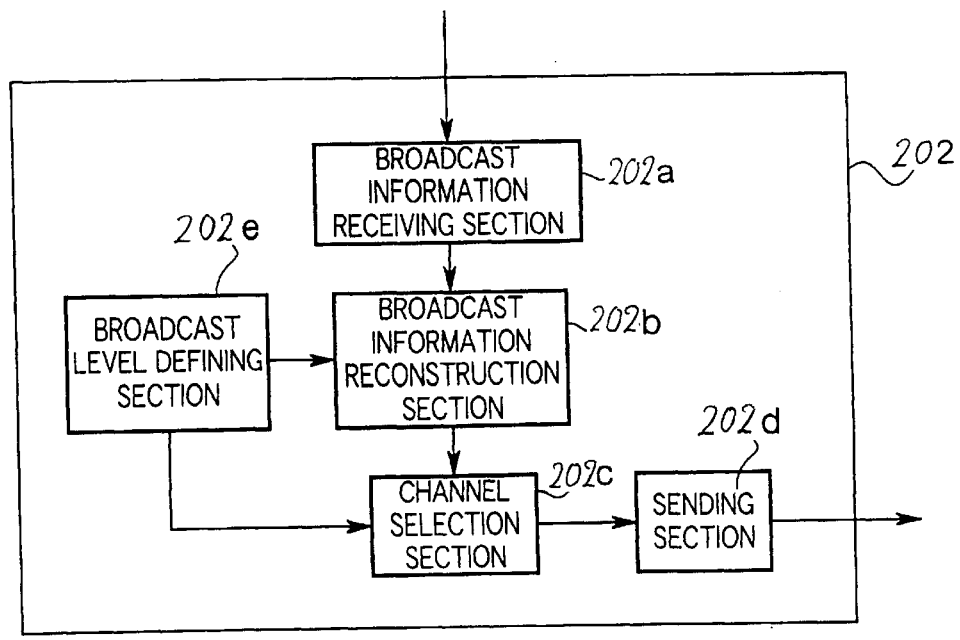
FIG. 7 is a block diagram of the structure of a server 202 in Embodiment 3.
Figure 9:
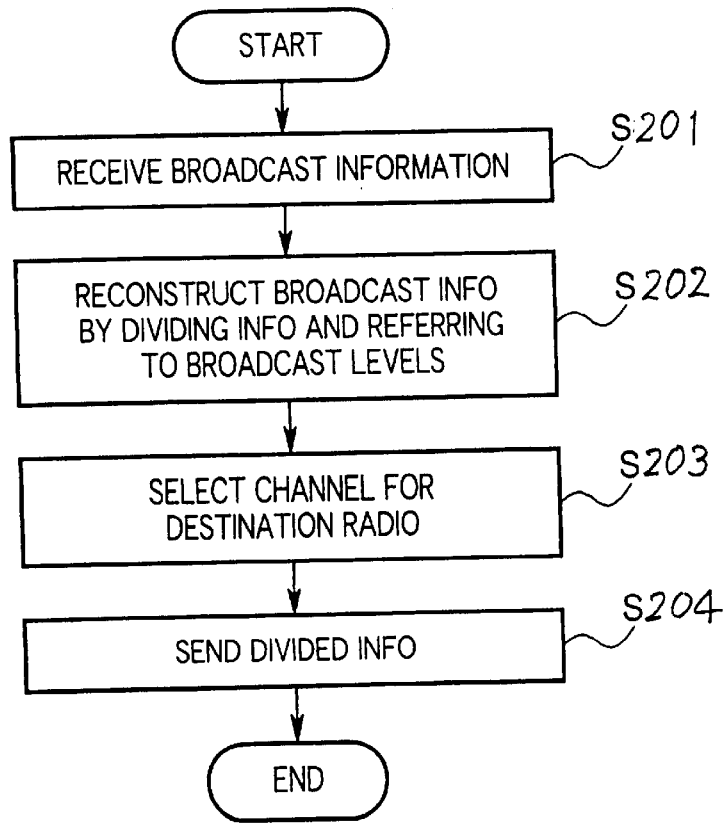
FIG. 9 is a flowchart showing the operation of the server 202 shown in FIG. 7.

FIG. 7 shows a block diagram of the structure of the server 202. FIG. 9 shows a flowchart to shows the steps taken by the server 202.

First, the broadcast information receiving section 202a provided in the server 202 receives broadcast information delivered from the broadcast terminal 201 (step 201), and holds this broadcast information in the broadcast information receiving section 202a.

In this case, the broadcast information receiving section 202a judges whether the information received is broadcast information according to whether or nor the header section contains the identifier to indicate that the information sent is broadcast information.

Continuing on, the broadcast information reconstruction section 202b reads the broadcast information stored in the broadcast information receiving section 202a, and at the same time, refers to the broadcast level defining section 202e and reconstructs the read information to match the broadcast levels of the mobile terminals 204-1~4 being connected thereto (step 202).

Here, reconstruction refers to a process of constructing broadcast information by deleting from the received information such information not required by the mobile terminal 204 in reference to the broadcast level number so that the information is constructed using only the required information.

Also, broadcast level numbers and communication channels are defined in the broadcast level defining section 202e for the mobile terminals 204-1~4 that are currently connected to the server 202.

Next, the channel selection section 202c selects a channel to correspond to each mobile terminal 204 in reference to the broadcast level defining section 202e (step S203), and forwards the reconstructed broadcast information to the sending section 202d.

Next, the sending section 202d sends broadcast information received from the channel selection section to each mobile terminal 204-1~4 through the respective channels selected by the channel selection section 202c (step S204).

If the server 202 and the mobile terminals 204-1~4 are communicating by packets, the channel selection section 202c may send the packets by converting the addresses of the receivers to the addresses of mobile terminals 204-1~4.

Accordingly, the server 202 receiving broadcast information, built by classifying the broadcast information into several information categories, reconstructs the broadcast information and sends only the required information to the mobile terminals 204 so that only the information necessary to respective mobile terminals 204 are received.

As explained above, according to this embodiment, broadcast information is built in the broadcast terminal according to categorized levels of the receivers, and the built broadcast information is distributed to specified networks, and therefore, the advantage of the invention is that it is possible to broadcast categorized information.

Also, another advantage is that according to the broadcast levels of the terminals connected to the computer server, only the information necessary to the individual terminals can be received.

Also, broadcast information can be delivered to the terminals that are mobile.

Next, Embodiment 4 will be explained with reference to FIGS. 6, 8 and 10.

Figure 8:
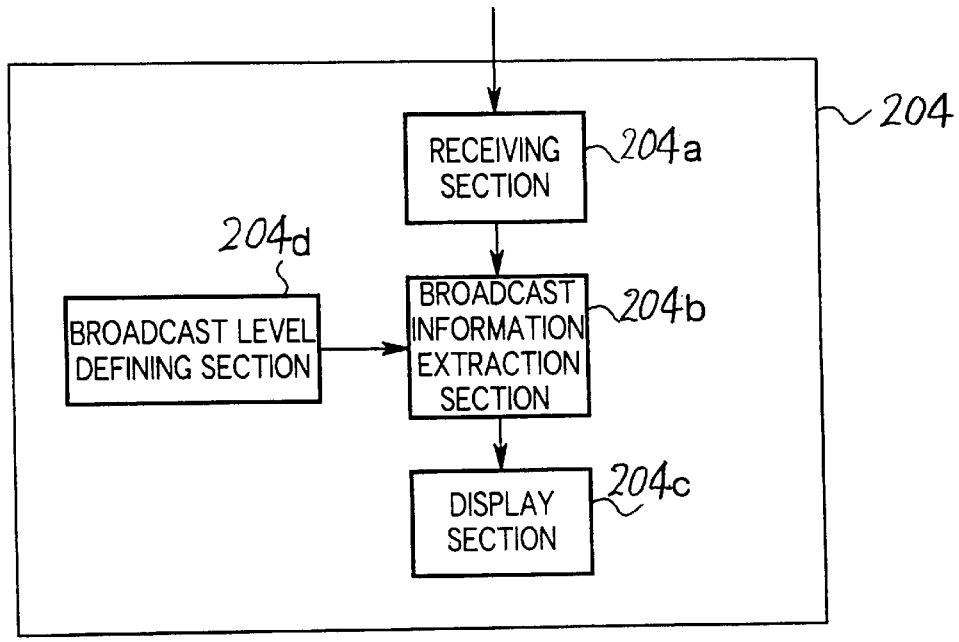
FIG. 8 is a block diagram of the structure of a mobile terminal 204-1~4 in Embodiment 4.

FIG. 8 shows a block diagram of a structure of the mobile terminal 204. FIG. 10 shows a flowchart of the operation of the mobile terminal 204 shown in FIG. 8.

The operation of the mobile terminal 204 will be explained with reference to FIGS. 8 and 10.

First, as described earlier, broadcast information is built by the broadcast information preparation terminal 201 and the information is broadcast within the network 5. Next, the server 202 receives the broadcast information and distributes the as-received information to the mobile terminals 204-1~4.

In the following explanation, action of the mobile terminals 204-1~4 are all the same, and therefore, only the actions of the mobile terminal 204-1 will be explained.

When the server 202 receives broadcast information, the broadcast information receiving section 204a provided in the mobile terminals 204-1 receives this information (step S211), and stores it in the broadcast information receiving section 204a.

At this time, the broadcast information receiving section 204a judges whether the information received is broadcast information according to whether or nor the header section contains the identifier to indicate that the information sent is broadcast information.

Next, the broadcast information extraction section 204b reads the broadcast information stored in the broadcast information receiving section 204a, at the same time, in reference to the broadcast level defining section 204d, extracts only the information necessary to this mobile terminal 204-1 (step S212).

At this time, because broadcast level of the mobile terminals 204-1 is defined in the broadcast level defining section 204d, only the necessary information according to the broadcast level number is extracted from the broadcast information shown in FIG. 11.

Next, the broadcast information extraction section 204b displays the extracted information on a display section 204c (step S213).

By so doing, only the information necessary to the mobile terminal 204-1 is displayed on the display section 204c provided in the mobile terminal 204-1.

Accordingly, because only the necessary information is extracted from the received broadcast information and displayed, it is possible to eliminate information not needed by this mobile terminal 204-1.

Also, because the judgment whether or not the information is necessary to the mobile terminal 204-1 is made according to the categorized levels of individual mobile terminals 204, it is possible to select broadcast information to be receive by changing the classification method for distributing the broadcast information at the mobile terminals 204.

Here, the explanation provided above relates to the case of radio communication provided by the mobile terminals 204, but the terminals to be connected to the server 202 may be a wired type. Further, the structure shown in FIG. 8 can be adopted to wired terminals.

Also, the terminals having the structure shown in FIG. 8 may be a type that is connected directly to the network 5.

Also, broadcast information is not limited to text data, voice data and signals having special meaning may be included. In such a case, the display section 204c shown in FIG. 8 may be replaced with a speaker to reproduce the voice or warning device to sound warning upon receiving the signal.

Figure 10:
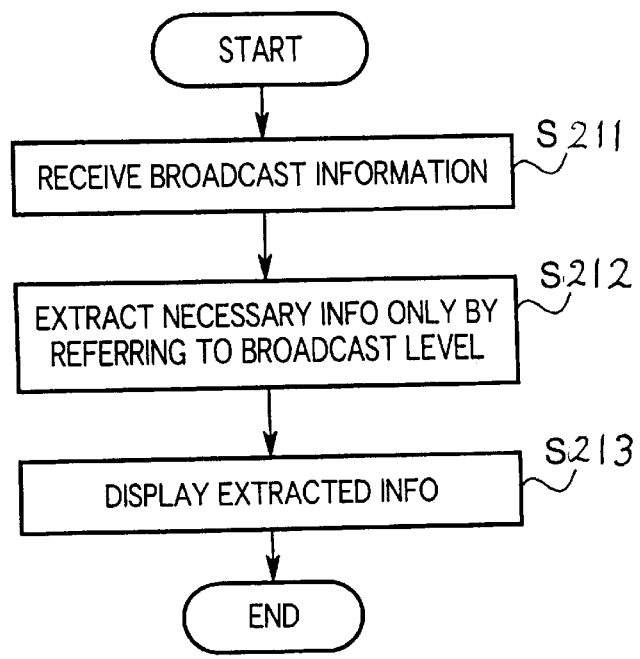
FIG. 10 is a flowchart showing the operation of the mobile terminal 204-1~4 shown in FIG. 8.

Also, an application program to execute the steps shown in FIGS. 9, 10 may be recorded on a computer-readable recording medium, and the recorded program may be read by computer means to execute the process of classifying the broadcast information.

That is, a broadcast information display program recorded on a computer-readable recording medium containing an application program to provide broadcast information display enables the computer means to execute a function to receive broadcast information distributed, a function for extracting only the information necessary to a terminal device from the received broadcast information in reference to a broadcast level defining section that defines categorized contents, and a function for displaying only the information extracted from the broadcast information.

Also, a broadcast information distribution program recorded on a computer-readable recording medium containing an application program to provide broadcast information distribution enables the computer means to execute a function to receive broadcast information broadcast to the network that is connected to the computer server, a function to reconstruct the received broadcast information in reference to the broadcast level defining section that defines categories, and a function for sending reconstructed broadcast information to a terminal device connected to the computer server.

Also, it is further preferable to combine various devices employed in Embodiments 1–4. Such combinations would be even more useful in emergency and disaster situations.

For example, police, fire fighters, self-governing bodies and individuals are classified beforehand, and a mailing message is built at the time of a disaster. Then, the classifications are organized so that the police will receive all messages, self-governing bodies will receive only messages directed to themselves and to individuals, and individual citizens can receive only messages directed to individuals. Such categorized messages are sent to the computer server. The computer server sends the messages to the receiving mobile terminals (terminal devices), but the mobile terminals themselves select messages to be received according to the broadcast levels numbers. By arranging the system in this manner, it will be possible to reduce the traffic volumes in the backbone side during the disaster situation in the wired networks and radio networks under the management of radio servers. In addition to disaster situations, the system can also be used in general for distributing news.

In the following, Embodiment 5 will be explained with reference to the drawings.

Figure 13:
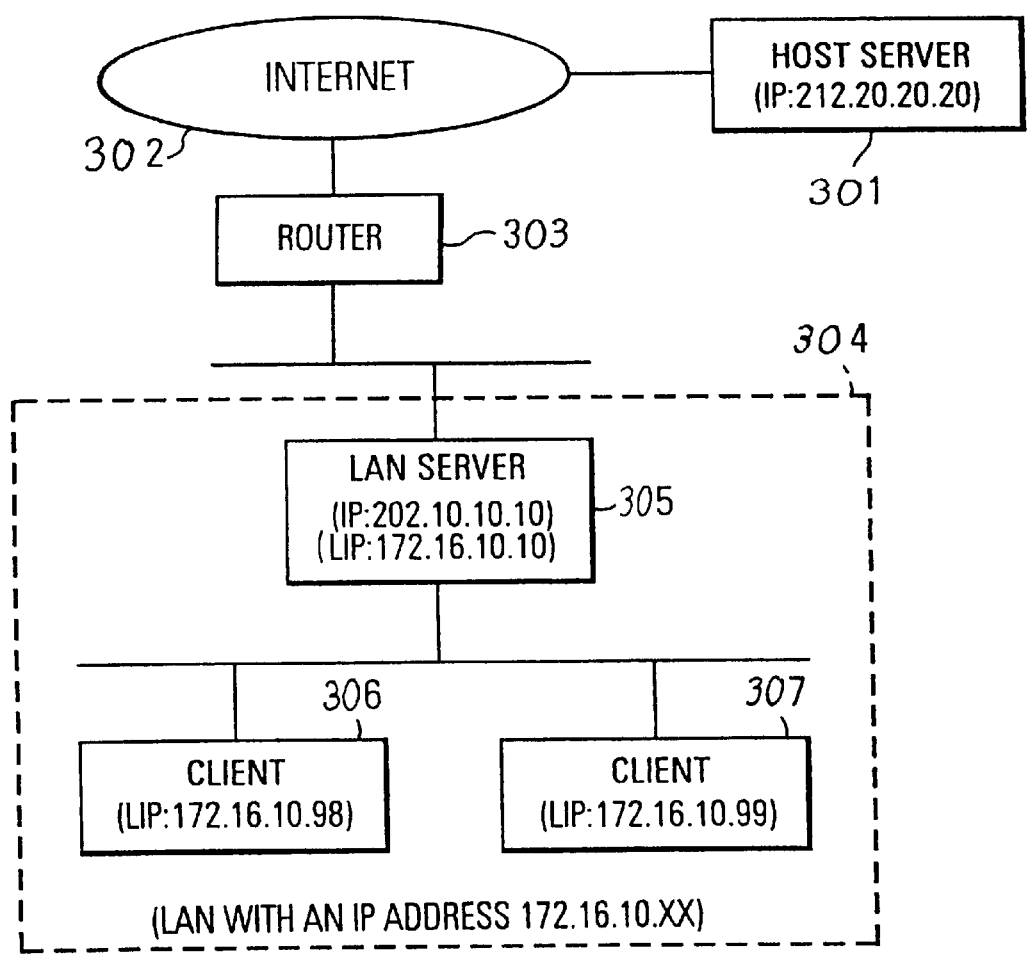
FIG. 13 is a block diagram of the structure of a communication network system using a network address conversion device in Embodiment 5.

First, an overall configuration of the communication network that includes a network address conversion device in Embodiment 5 is shown in FIG. 13. In this diagram, 301 refers to a host server that provides a push-type information distribution service through the Internet 302 to specified clients. Also, this host server 301 has an Internet IP address (referred to as IP in the diagram, and hereinafter) [212.20.20.20]. 303 refers to a router and controls the transmission paths of data forwarded from the Internet or data sent from a LAN, to be described later, to their respective destination nodes.

304 refers to a LAN, and each node of the LAN is identified by an IP address (termed local address) [172.16.X.X.] where X represent a value dedicated to each node. 305 is a server for the LAN 304 (referred to as the LAN server hereinbelow) and provides communication control and other services for clients within the LAN 4 through the Internet 302 to interact with servers of other networks connected to the Internet 302.

Also, this LAN server 305 has a network address conversion device (to be described later) for providing push-type services from the host server 301 to the clients 306 or 307 within the LAN 304 through the Internet 302. Further, the LAN server 305 has an IP address [202.10.10.10] and a local IP address [172.16.10.10] (referred to as LIP hereinbelow).

306, 307 are clients within the LAN 304, and each is given only one IP address, which is [172.16.10.98] and [172.16.10.99], respectively. Also, the data header provided by the communication networks having the configuration described above includes Internet or local IP addresses of the receiver and the original sender.

Next, the network address conversion device provided in the LAN server 305 will be explained with reference to FIG. 14. In this diagram, 310 is an input/output section (I/O), and receives data sent from Internet 302 or LAN 304, and sends the received data to Internet 302 or LAN 304 in accordance with the IP addresses included in the received data. 311 refers to data analysis section, and analyzes the original sender, receiver and contents of the data received in the I/O section 310, and judges whether the received data is an Internet IP address allocation request (referred to as allocation request signal hereinbelow) sent from the Internet 302.

Here, the allocation request signal is a signal from the external host (host server 301 in this case), providing a push-type services, requesting the local network server (LAN server 305 in this case) to assign an Internet IP address to the client to whom information is to be supplied. The allocation request signal contains at least←an identifier information to indicate it is or is not an allocation signal (referred to as allocation request identifier hereinbelow) and ↑ information (local IP address in this case) to identify the client (client 306 or 307 in this case) to whom the external host is attempting to provide a service.

By this step, the data analysis section 311 judges whether the data received in the I/O section 310 from Internet 302 is an allocation request signal according to the presence or absence of the allocation request identifier.

312 refers to an IP address allocation section, and pre-stores a plurality of Internet IP addresses assigned to LAN 304, and, if the data analysis section 311 judges that that an allocation request signal has been received, selects one Internet IP address from a lot of currently unused Internet IP address of the pre-stored Internet IP addresses, and allocates it to the client requesting the allocation of Internet IP address.

313 refers to a conversion table preparation section, and has an address conversion table correlating the local. IP address of the client who requested an Internet IP address and the Internet IP address allocated to the client. And, each time an Internet IP address is assigned by the IP address allocation section 312 to a client requesting an allocation of an Internet IP address, this Internet IP address assigned to the client is correlated to the local IP address of the client and added to the address conversion table.

314 refers to an address conversion section and, in response to the request from the external host for an allocation request, when a corresponding new IP address is added to the address conversion table in the address conversion table preparation section 313, the Internet IP address allocated to the client requesting an allocation is sent to the external host that generated the allocation request signal by way of the I/O section 310.

Also, if the data analysis section 311 judges that the data received in the I/O section 310 from the Internet 302 is not an allocation request signal, the address conversion section 314 references the address conversion table, and converts the destination Internet IP address contained in the data sent from the external host to the local IP address of the client to whom the information is to be sent. And, the data sent from the external host is sent to the client having the converted local address along with the Internet IP address of the external host as the original sender.

Next, the operations of the various sections in the communication network system described above, when the host server 301 shown in FIG. 13 performs a push-type service to the client 306, will be explained with reference to the flowchart shown in FIG. 15. The flowcharts shown in FIG. 15(a) and 15(b) and 15(c) refer, respectively, to the actions of the host computer 1 and LAN server 305 and client 306. The dotted arrows in the drawing refer to flow paths of data.

First, in the case of the host server 301 presenting information to client 306, in step Sa1 shown in FIG. 15(a), an allocation request signal is sent to LAN server 305 requesting to allocate an Internet IP address to client 306. And, the data analysis section 11 in the LAN server 305 receiving this request signal, in step Sb1 in FIG. 15(b), first analyzes the received signal.

Then, it proceeds to step Sb2, and if it is judged that the received signal is an allocation request signal, the result is Yes, and it proceeds to step Sb3. On the other hand, if it is judged to be not an allocation request signal, the result is No, and it proceeds to step Sb5. In this example, it is assumed that an allocation request signal is received so that the result is Yes, and it proceeds to step Sb3.

Next, in step Sb3, the IP address allocation section 312 selects an Internet IP address that is not currently in use from the pre-stored Internet IP addresses, and allocates it to client 306. By so doing, the address conversion table preparation section 313 correlates the local IP address of client 306 with the Internet IP address allocated by the IP address allocation section 312, and stores them in the address conversion table.

Then, when the new corresponding IP address is added to the address conversion table in the address conversion table preparation section 313, it proceeds to step Sb4, and the address conversion section 314 sends the Internet IP address allocated to client 306 to the original sender, host server 301.

Accordingly, when the host server 301 receives the Internet IP address allocated to client 306 from the LAN server 305, it proceeds to step Sa2 shown in FIG. 15(a), and sends the data to be presented to client 306 to the Internet IP address received.

Then, when the data is received by LAN server 305, the data received by the data analysis section 11 is analyzed in step Sb1 shown in FIG. 15(b), and it is judged that the data is not an allocation request signal in step Sb2, and it proceeds to step Sb5.

In step Sb5, the address conversion section 314 converts the Internet IP address contained in the received data analyzed by the data analysis section 313 to the local IP address of the client 306, according to the address conversion table in the address conversion table preparation section 313.

Next, it proceeds to step Sb6, and the address conversion section 314 sends the data sent from the host server 301 to the converted local IP address, that is, to client 306 by way of the I/O section 310. Accordingly, in step Sc1 shown in FIG. 15(c), client 306 receives the data presented by the host server 301.

Here, the example described above related to the case of the host server 301 presenting information to the client 306, client 307 or other not-indicted clients managed by LAN server 305 may also receive information by performing similar operations.

Also, in the communication network system describe above, conversely, if an access request is made from the side of client 306 or 307 to the external host server (that is, host servers other than the host server having an IP address [172.16. X.X]), the network address conversion section in the LAN server 305 may be used to provide a process similar to conventional NAT. In this case, the data analysis section 311 analyzes the data received by way of the I/O section 310, and confirms that the signal is an access signal from client in the LAN to the host computer according to the destination IP address and the original sender IP address included in the data.

Accordingly, the address allocation section 312 allocates an Internet IP address to the client requesting access, and prepares its address conversion table in the address conversion table preparation section 313. The address conversion section 314 converts the original sender IP address included in the data sent from the client to the Internet IP address allocated by the IP address allocation section 312, and sends it to the host server that is being requested.

Subsequently, regarding the data sent from the host computer to the client, the destination IP address is converted, in reference the address conversion table, to the local IP address in the address conversion section 314, and, regarding the data sent from the client to the host server, the original sender IP address is converted to the allocated Internet IP address, thereby enabling the two to communicate with each other.

Accordingly, in Embodiment 5, a server managing the local network allocates an Internet IP address, in response to an allocation request made from an external host, to the client to whom the external host is attempting to present information, then, the address conversion table is built, and the allocated Internet IP address is sent to the external host.

Subsequently, the external host sends the data to the notified IP address, and in the meantime, the server converts the Internet IP address received to the local IP address of the client, in reference to the address conversion table, and sends the data sent by the external host. This procedure enables a push-type information distribution service to be provided to the client within a local network who does not have an Internet IP address.

Here, it is further preferable that the external host be a push-type function server described in Embodiment 1.

Next, Embodiment 6 will be explained with reference to FIGS. 16 and 17.

Figure 16:
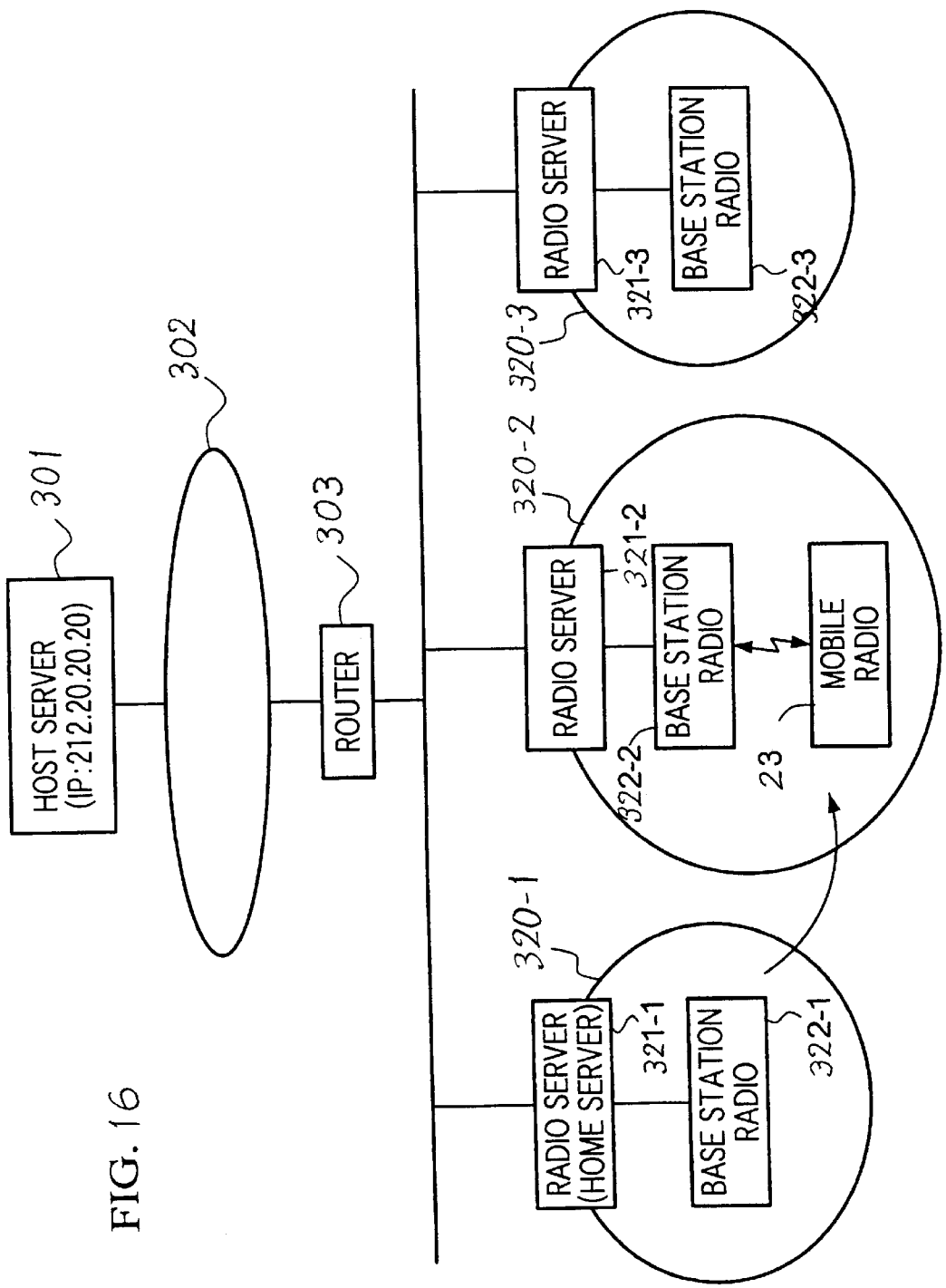
FIG. 16 is a block diagram of the structure of a radio communication network system using a network address conversion device in Embodiment 6.

FIG. 16 shows a configuration of the radio communication network system having a network address conversion device of this embodiment. In this diagram, those parts that are the same as those in the communication network system shown in FIG. 13 are given identical reference numerals, and their explanations are omitted. The points of difference between the two systems shown in FIGS. 13 and 16 are as follows.

First, 321-1~321-3 are radio servers connected to a router 303, and each server manages respective subnetworks 320-1~320-3. Also, each radio server has an Internet IP address and a local IP address in the subnetwork under its management. 322-1~322-3 are base station radios and are connected to respective radio servers 321-1~321-3. In this case, to simplify the diagram in FIG. 16, one base station radio is shown for one radio server, but a plurality of base station radios may be connected to one radio server. 323 refers to a mobile terminal, and is connected by radio to one of the base station radios 322-1~322-3, and communicates with the radio servers 321-1~321-3. Here, in FIG. 16, only one mobile terminal 323 is shown, but in practice, a plurality of mobile terminals will be operating concurrently. Therefore, clients within the subnetworks 320-1~320-3 are represented by the plurality of mobile terminals operating in the communication regions of the subnetworks 322-1~322-3.

Each mobile terminal belongs to a given radio server (referred to as a home radio server hereinbelow), and each radio server constantly monitors the current locations of mobile terminals operating inside its own managing district. For example, if the home radio server of the mobile terminal 323 is radio server 321-1, when the mobile terminal 323 moves from the operating district of the base station radio 322-1 into the operating district of the base station radio 322-2, the mobile terminal 323 sends a dedicated identifier number assigned to its own terminal and the IP address of the home radio server (radio server 321-1) to the radio server 321-2 by way of the base station radio 322-2 for registration authentication.

Then, the radio server 321-2, responding to the registration authentication action, selects and send a suitable IP address to be assigned to the mobile terminal 323 and gives an IP address within the subnetwork 320-2, which is its own managing district, to the mobile terminal 323.

The radio server 321-2 judges whether the identifier number received in the registration authentication action is an identifier number of a mobile terminal that belongs to one of its own mobile terminals. If it is judged that the mobile terminal is not one of its own, the identifier number of the mobile terminal 323 received during the registration authentication action is sent to the IP address of the home radio server (radio server 321-1, in this case) of the mobile terminal 323 via the Internet 302.

When the radio server 321-1 receives this identifier number, the received identifier number is correlated with the IP addresses of the original sender, which is radio server 321-2, and stored. By so doing, the current location of the mobile terminal 323 (operating district of the base station radio 322-2) is derived. For example, each radio server may be provided with a current location memory section, so that the identifier numbers of all the mobile terminals belonging to itself can be correlated with the current Internet IP addresses of the radio servers and storing the results in the current location memory section for the mobile terminals, thereby making it possible to derive the current locations of all the mobile terminals under its own management.

Next, the structure of the network address conversion device which is provided in each of the radio servers 321-1~321-3 will be explained with reference to FIG. 17. In this diagram, those parts that are identical to those in the network address conversion device shown in FIG. 14 are given the same reference numerals, and their explanations are omitted. The difference between the network address conversion device of this embodiment and that shown in FIG. 14 is that in addition to judging the data receiving in the data analysis section 311 is an allocation request signal, it judges whether the signal is a location identifier (for this reason, the reference numeral is 311').

The location identifier mentioned above is a signal output by the host server 301 to inquire the current location of a mobile terminal which is the intended receiver of information, and includes at least←an identifying number to indicate that it is a current location inquiring signal (referred to as the location identifier) and ↑ an identifier number of the intended receiving mobile terminal (a number different from the IP address, and is dedicated to each mobile terminal).

Also, in the network address conversion device in this embodiment has a current location search section 315 for searching through the current location memory section for the mobile terminals (325 in FIG. 17) described above, so that when the received data in the data analysis section 311' is a location identifier, according to the identifier signal contained in the location identifier, an Internet IP address correlated and stored is sent to the host server by way of the I/O section 310.

In the radio communication network system described above, actions of the various sections in providing push-type information distribution from the host server 301 connected to the Internet 2 to the mobile terminal shown in FIG. 16 will be explained with reference to the flowcharts shown in FIGS. 18(a), (b), (c), (d) which respectively relate to the radio server 321-1 (the home radio server of the mobile terminal 323, host server 301), radio server 321-2, and mobile terminal 323. The dotted arrows refer to flow paths of various data.

First, when the host server 301 wishes to deliver data to the mobile terminal 323, it outputs a location identifier in step Sd1 shown in FIG. 18 to the radio server 321-1 which is the home radio server of the mobile terminal 323. The data received in the data analysis section 311' is analyzed in the radio server 321-1 in step Se1 shown in FIG. 18(a).

It proceeds to step Se2, and it is judged whether the received signal is a location identifier. If it is judged that the received signal is a location identifier, the result is Yes, and it proceeds to step Se3. In this case, radio server 321-1 has received a location identifier, so the result is Yes, and it proceeds to step Se3. Here, if the signal is judged to be not a location identifier in step Se2, the next processing step will be described later.

Upon proceeding to step Se3, the current location search section 315 searches through the mobile terminal current location memory section 325 according to the identification signal included in the location identifier. Then, it proceeds to step Se4, and the current location search section 315 detects an Internet IP address corresponding to the identification signal (the Internet IP address of the radio server 321-2 in this case) included in the location identifier, which is sent to the host server 301 by way of the I/O section 310.

Then, it proceeds to step Sd2 shown in FIG. 18(b), and the host server 301 sends an allocation request signal to the radio server 321-2 managing the subnetwork 320-2 to issue an Internet IP address to the mobile terminal 323. And, the radio servers 321-2 receiving this allocation request signal first analyzes the data received using the data analysis section 311' in step. Sf1 shown in FIG. 18(c).

It proceeds to step Sf2, and if it is judged that the data received is a location identifier, the result is Yes, it performs the steps subsequent to step Se3 described earlier, and if it is judged that the data received is not a location identifier, the result is No, and it proceeds to step Sf3. Also, if it is judged that the data is not a location identifier, it performs the steps subsequent to step Se shown in FIG. 18(a).

Here, the process performed in the radio servers 321-1~321-3 is identical in all the servers, for example, the procedures in the steps Se1, Se2 shown in FIG. 18(a) are identical to the steps Sf1, Sf2 shown in FIG. 18(c). Therefore, if the judgment result in step Sf2 in the radio server 321-2 is Yes, the steps subsequent to step Se3 shown in FIG. 18(a) are performed. Also, if the judgment result in step Se2 in the radio server 321-1 is No, the steps subsequent to step Sf3, which will be described below, are performed.

In step Sf2, if it is judged that the received data is not a location identifier, it proceeds to step Sf3, and it is judged whether the received signal is an allocation request signal. Then, if it is judged that the received data is an allocation request signal, the result is Yes, and it proceeds to step Sf4. On the other hand, if it is judged that the received signal is not an allocation request signal, the result is No, and it proceeds to step Sf6. In this case, the radio servers 321-2 had received an allocation request signal, the result is Yes, and it proceeds to step Sf4.

In step Sf4, the IP address allocation section 312 selects one address from the not-in-use Internet IP addresses, allocates this selected address to the mobile terminal 326. Accordingly, the address conversion table preparation section 313 correlates the IP address of the mobile terminal 323 and the allocated Internet IP address assigned by the Internet IP address allocation section 312 and stores the result in the address conversion table.

When the new IP address is added to the address conversion table in the address conversion table preparation section 313, it proceeds to step Sf5, and the address conversion section 314 sends the allocated Internet IP address to the original sender of the allocation request signal, which is the host server 301.

Accordingly, the host server 301 receives the Internet IP address allocated to the mobile terminal 323 from the radio server 321-2, then it proceeds to step Sd3, and the host server 301 sends the data to the mobile terminal 323 at the Internet IP address received.

Then, when the radio servers 321-2 receives this data, the data analysis section 311' analyzes the data received in step Sf1 shown in FIG. 18(c). In this case, the data received by the radio servers 321-2 is neither a location identifier nor allocation request signal, and the results of judgment in steps Sf2 and Sf3 are both No.

Accordingly, it proceeds to step Sf6, and the address conversion section 314 converts the destination Internet IP address included in the received data analyzed by the data analysis section 311 to the IP address of the mobile terminal 323 according to the address conversion table in the address conversion table preparation section 313.

Next, it proceeds to step Sf7, the address conversion section 314 sends the data sent from the host server 301 to the converted local IP address, that is, to the mobile terminal 323, by way of the I/O section 310 and the base station radio 322-2. Accordingly, the mobile terminal 323 receives data presented by the host server 301.

Further, even when the mobile terminal 323 moves from the operating district of the base station radio 322-2 to the operating district of the base station radio 322-3, the radio server 321-1 will be able to derive the current location of the mobile terminal 323 when it performs a registration authentication action within the operating district of base station radio 322-2. Then, when the radio server 323-3, which manages the subnetwork 320-3, performs the process shown in FIG. 18(c), the host server 301 is able to provide push-type information distribution services to the mobile terminal 323.

Also, when the mobile terminal 323 belongs to a subnetwork 320-1 managed by the radio server 321-1 (home radio server of the mobile terminal 323), the radio server 321-1 would first perform the steps Se1, Se2 shown in FIG. 18(a), and then performs the steps subsequent to step Sf3 shown in FIG. 18(c), therefore, as in the case described above, the host server 301 can provide push-type information distribution services to the mobile terminal 323.

Figure 14:
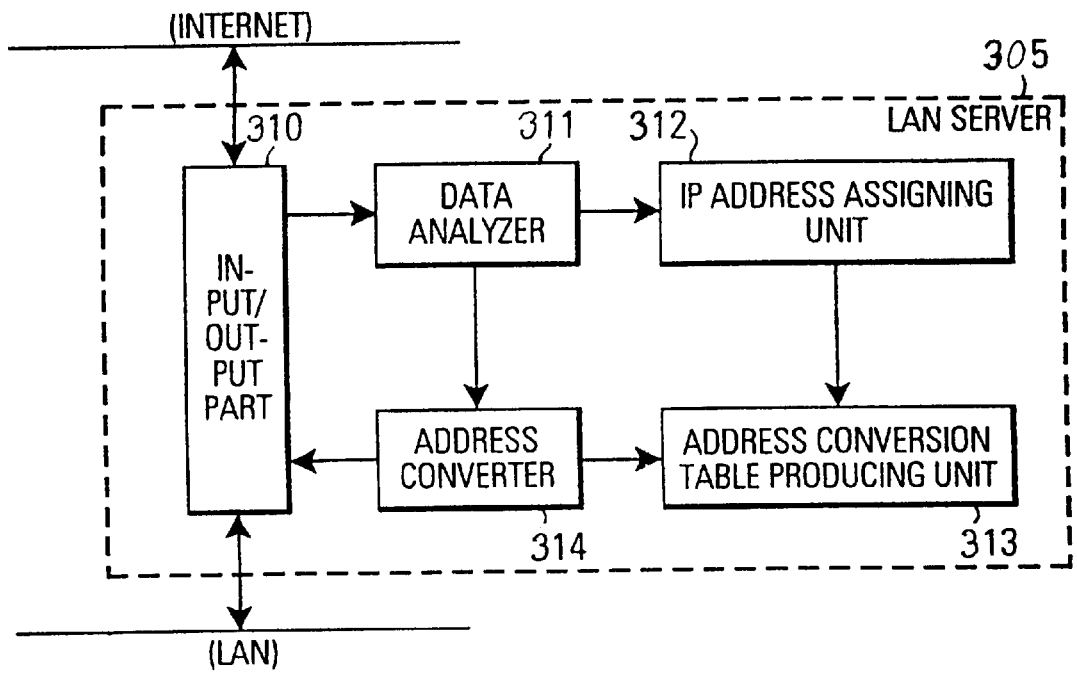
FIG. 14 is a block diagram showing the structure of the network address conversion device.
Figure 17:
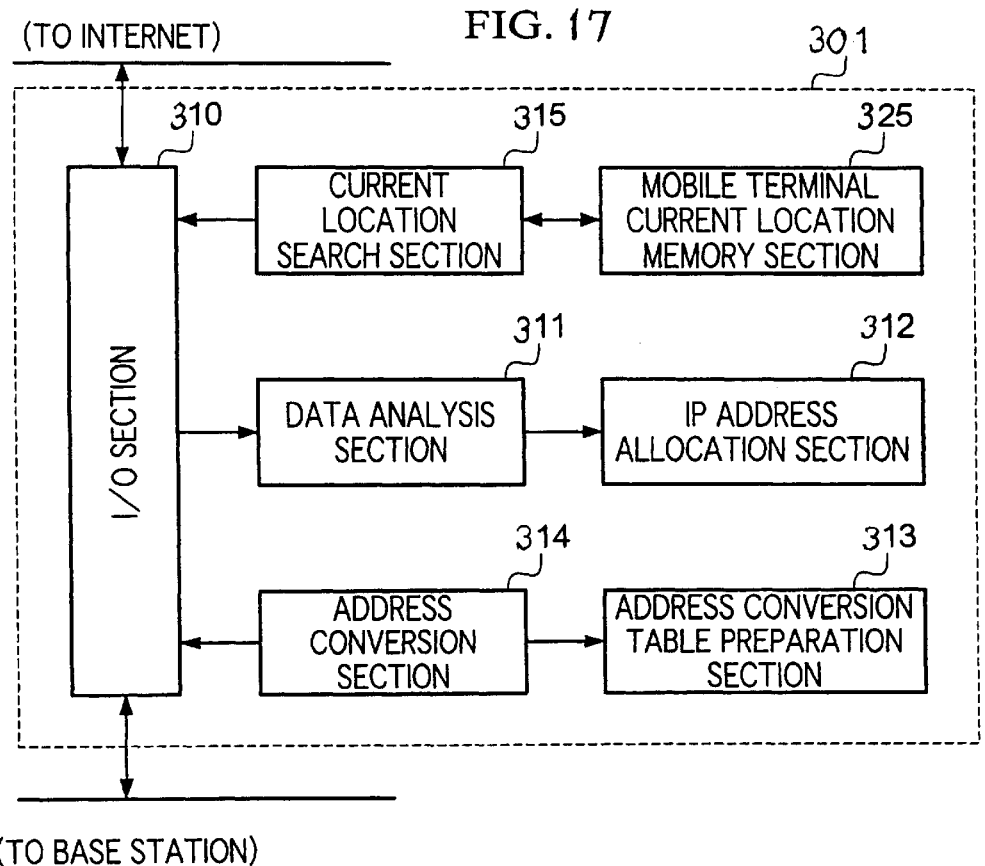
FIG. 17 is a block diagram showing the structure of the network address conversion device.

Also, the network address conversion function described in Embodiments 5, 6 may be realized by providing independent components for the configurations shown in FIG. 14 or 17 in regions outside of the LAN server 305 or radio servers 321-1~321-3.

Further, an application program to execute the steps shown in FIG. 15(b) or FIG. 18(a), (c) may be recorded on a computer-readable recording medium, and the recorded program may be execute by computer means to carry out the processes described above.

That is, a network address conversion program, for converting a destination address of received data, recorded on a computer-readable recording medium containing an application program to provide network address conversions may be enabled by computer means to execute:

a function to receive data to be exchanged between an external host server and a client, and to analyze the received data for its type, original sender and destination; and when a result of analysis indicates that the received data is an allocation request signal, a function to allocate an address selected from a plurality of pre-stored Internet IP addresses to a client requesting an Internet IP address allocation by means of the allocation request signal, when the analysis result indicates that the received data is an Internet IP address allocation signal from an external host server;

a function to prepare and store an address conversion table, for each allocation of an Internet IP address to each client, correlating the Internet IP address allocated to a client and an address of that client in a local network; and a function to send the allocated Internet IP address to the original sender of the Internet IP address request signal, and, if it is judged from the result of analysis that the received data is to be sent to the Internet IP address allocated to the client, to convert the Internet IP address of the client to an address within the local network of the client corresponding to the Internet IP address, in reference to the address conversion table for each allocation of each Internet IP address to the client.

Also, the network address conversion program may be executed by computer means so that a system having a plurality of subnetworks each subnetwork having at least one mobile terminal and a radio server connected to the mobile terminal by radio communication, where the mobile terminal is permitted to move freely among the subnetworks, and each radio server stores and manages Internet IP addresses of radio servers managing respective subnetworks in which mobile terminals are currently operating, and the network address conversion program converts an address included in data exchanged between the mobile terminals and the external host server connected to the Internet, and the network address conversion program responds to each radio server, and has a function to receive a location identifier regarding a specific mobile terminal from the external host server and to notify to the host server an Internet IP address of a specific subnetwork that is currently managing the specific mobile terminal; a function to allocate an Internet IP address to the specific mobile terminal, in response to an address allocation request signal from the external host server and to notify the allocated Internet IP address to the external host server; and, in response to the external host server sending data addressed to the notified Internet IP address, a function to convert the Internet IP address of the received data into an address of a subnetwork in which the mobile terminal is currently operating.

And, the network address conversion program executes a function to receive data to be exchanged between an external host server and a client and to analyze the received data for its type, original sender and destination; and when analysis result indicates that the received data relates to a location identifier, a function for a responding radio server to search through Internet IP addresses of mobile terminals stored in the radio server and of radio servers currently managing subnetworks in which mobile terminals are operating, to find an Internet IP address of a radio server currently managing the mobile terminal, and to send a searched Internet IP address to the original sender of the location identifier; and when analysis result indicates that the received data relates to an Internet IP address allocation signal from the external host server, a function to allocate an Internet IP address selected from a plurality of pre-stored Internet IP addresses to the mobile terminal requesting an Internet IP address by means of the Internet address allocation signal; a function to prepare and store an Internet IP address conversion table, for each allocation of an Internet IP address to each mobile terminal, correlating the Internet IP address allocated to a mobile terminal and an address of that mobile terminal in a subnetwork; and a function to send the allocated Internet IP address, for each allocation of an Internet IP address to a mobile terminal, to the original sender of the Internet IP address request signal, and, if it is judged from the result of analysis that the received data is to be sent to the Internet IP address allocated to the mobile terminal, to convert the Internet IP address which is the destination address of the data to an address of the mobile terminal within the local network corresponding to the Internet IP address, in reference to the address conversion table.

As described above, according to Embodiments 5 and 6, the push-type information distribution service can be provided even in a radio communication system in which a plurality of clients including mobile terminals are permitted to move freely from one operating district to another operating district.

The functions of the network address conversion device in Embodiments 5, 6 are used when sending a message from some network to other private network operating on the Internet protocol address system and the destination IP address may not be known to the sender so that the network address conversion device may be used instead to notify the sender of the destination IP address of the receiver.

Therefore, it is further preferable to combine various devices employed in Embodiments 1, 2 with those in Embodiment 6.

An example of such combinations is to place the network address conversion device between the router 105-2 and the internal network as shown in FIG. 2.

In such a case, when the mail monitor 107-3 is sending a message (mail), it passes through the network address conversion device, and is forwarded to the mobile terminal 103-1 according to the process demonstrated in Embodiment 6. Accordingly, it is possible to provide the push-type information distribution to a network such as intranet, which is based on private addresses.

In the following, Embodiment 7 will be presented with reference to the drawings.

Figure 20:
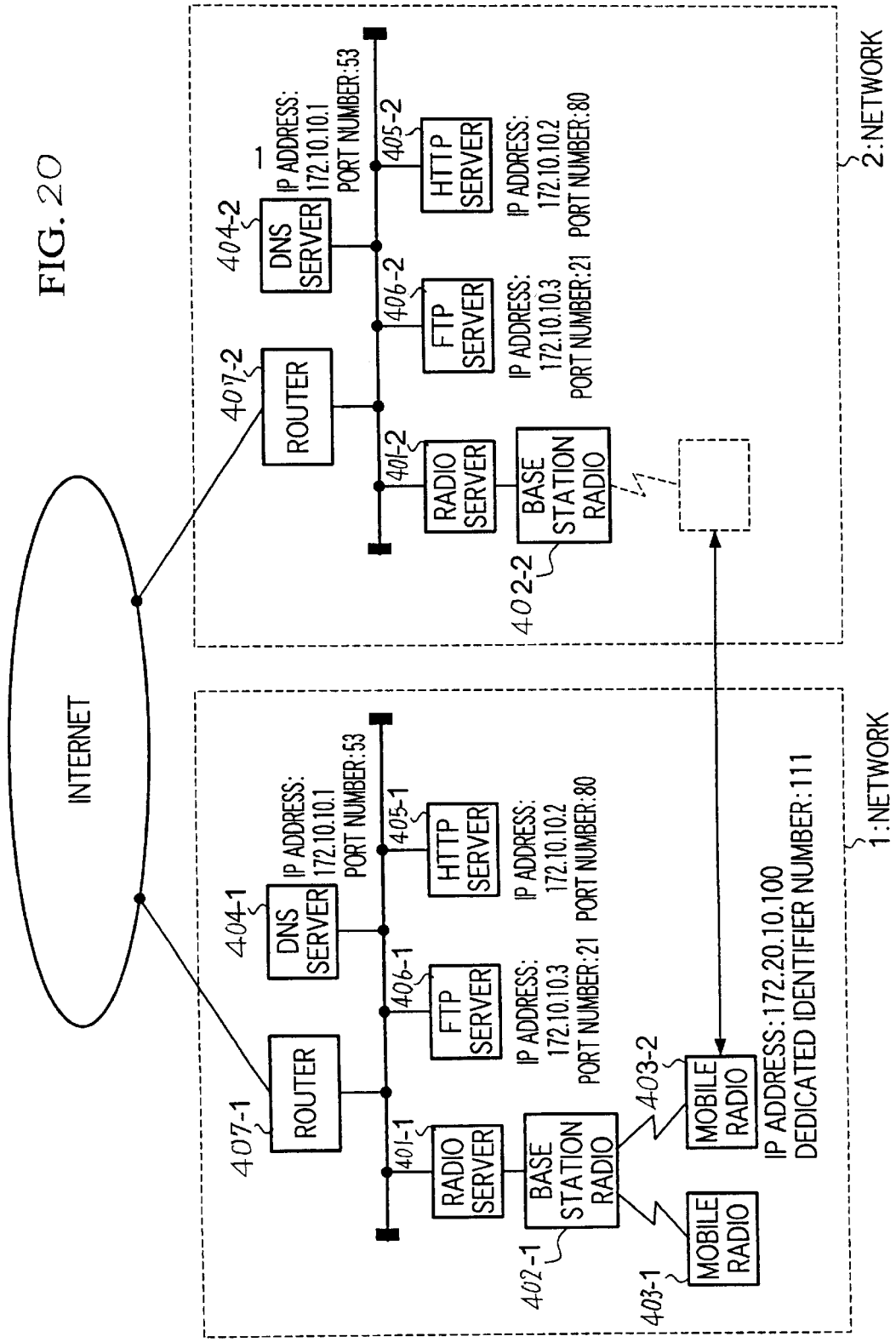
FIG. 20 is a diagram showing an application example of the radio server.

FIG. 20 shows an application example based on the radio server of Embodiment 7. In this embodiment, two networks n (n=1, 2) are connected to the Internet through routers 407-n (n=1, 2). The radio servers 401-n (n=1, 2) according to this embodiment are disposed in and connected to the networks n (n=1, 2). In each network n (n=1, 2), various function servers are connected such as DNS servers 404-n (n=1, 2), HTT servers 405-n (n=1, 2), FTP servers 406-n (n=1, 2). In this embodiment, function servers relate to these servers. The mobile terminals 403-1 belongs to network 1, and communicates by radio signals with the radio server through the base station radio 402-1. The diagram shows a situation in which the mobile terminal 403-2 belonging to network 2 has moved into the operating district of network 1 and is connected to the radio server 401-1. In this case, two networks 1, 2 are shown, but is not necessary to limit to two. Also, it is not necessary to limit the number and types of mobile terminals 403-n (n=1, 2) and various servers.

Figure 19:
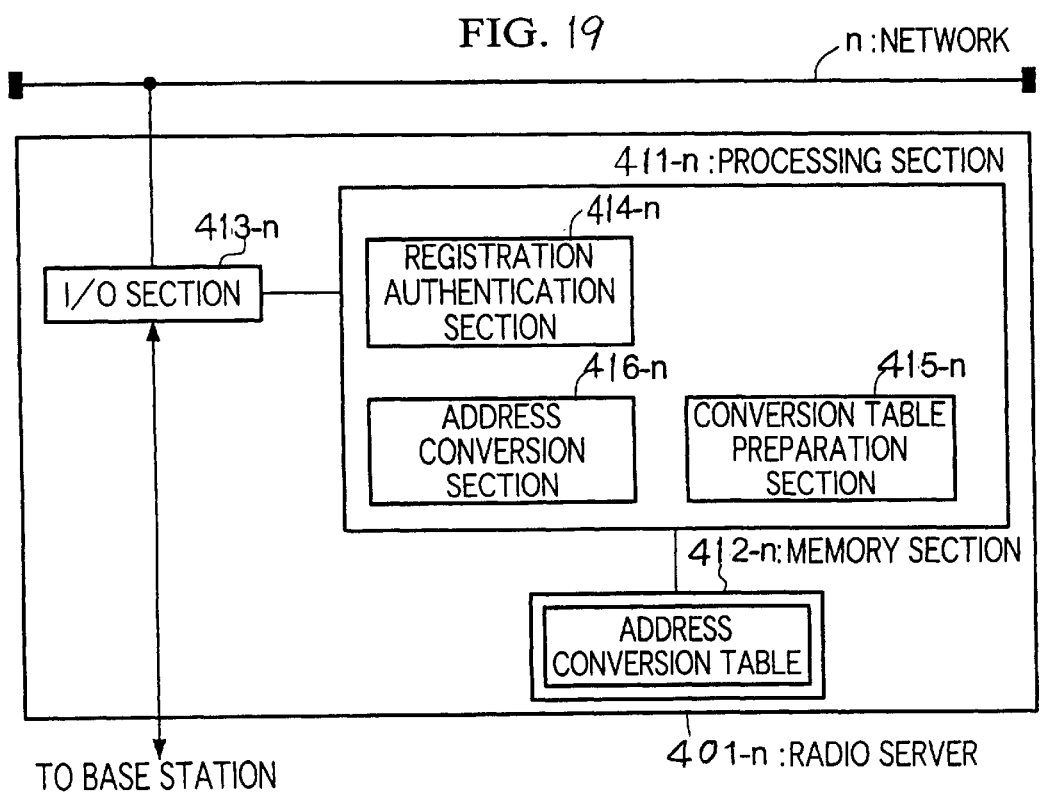
FIG. 19 is a block diagram of the structure of a radio server in Embodiment 7.

FIG. 19 shows a block diagram of the radio server of this embodiment. In this embodiment, a plurality of radio servers 401-n (n=1, 2, . . . ) are assumed to be connected to the Internet. Also, the communication protocol is assumed to be TCP/IP, but it is not necessary to limit to this protocol.

The radio server 401-n in this embodiment is comprised by: a registration authentication section 414-n; a processing section 411-n having an address conversion section 416-n; a memory section 412-n including an address conversion table; an I/O section 413-n connect to the Internet and a base station radio 402-n for exchanging data.

The registration authentication section 414-n, in response to a registration authentication request sent from the mobile terminal 403-n to connect to the radio server 401-n, judges whether or not the mobile terminal 403-n belongs to its own network or to another network. If it is judged that it belongs to another network, the registration authentication section 414-n further:

(1) requests IP address of the mobile terminal 403-n and IP addresses and port numbers of various servers such as HTTP server, DNS server, and mail server from another radio server 401-n' to which the mobile terminal 403-n belongs (referred to as the home radio server hereinbelow), when the mobile terminal 403-n itself does not have its own IP address and IP addresses and port numbers of various function servers and receives such data.

(2) when the mobile terminal 403-n has its own IP address and IP addresses and port numbers of various function servers, it receives IP address of the mobile terminal 403-n and IP addresses and port numbers of various servers such as HTlP server, DNS server, and mail server from the mobile terminal 403-n.

The conversion table preparation section 415-n prepares an address conversion table, based on the data received from home radio server 401-n' or the mobile terminal device 403-n in the registration authentication section 414-n. This address conversion table correlates IP addresses of various servers in another network to which a home radio server belongs with the IP addresses of various servers in its own network, thereby correlating its own network and the IP addresses of the mobile terminals 403-n operating in other networks.

The address conversion section 416-n responds to service requests from the mobile terminal 403-n to various servers, when a mobile terminal does not belong to its own network, and converts IP addresses and port numbers of various servers and the mobile terminal 403-n so that they may correspond with those in the own network by referencing an address conversion table. It thus enables the mobile terminal 403-n to access various serves within its own network.

Here, it is assumed that each network n has at least one radio server 401-n.

Also, the processing section 411-n is comprised by at least one CPU (central processing unit) and its functions are realized by loading into memory and executing a program (not-shown) to realize each function in the processing section 411-n. Here, the memory section 412 is comprised by a non-volatile recording device such as EEPROM (electrical erasable read only memory), hard disc, opto-magnetic disc and the like.

Figure 21:
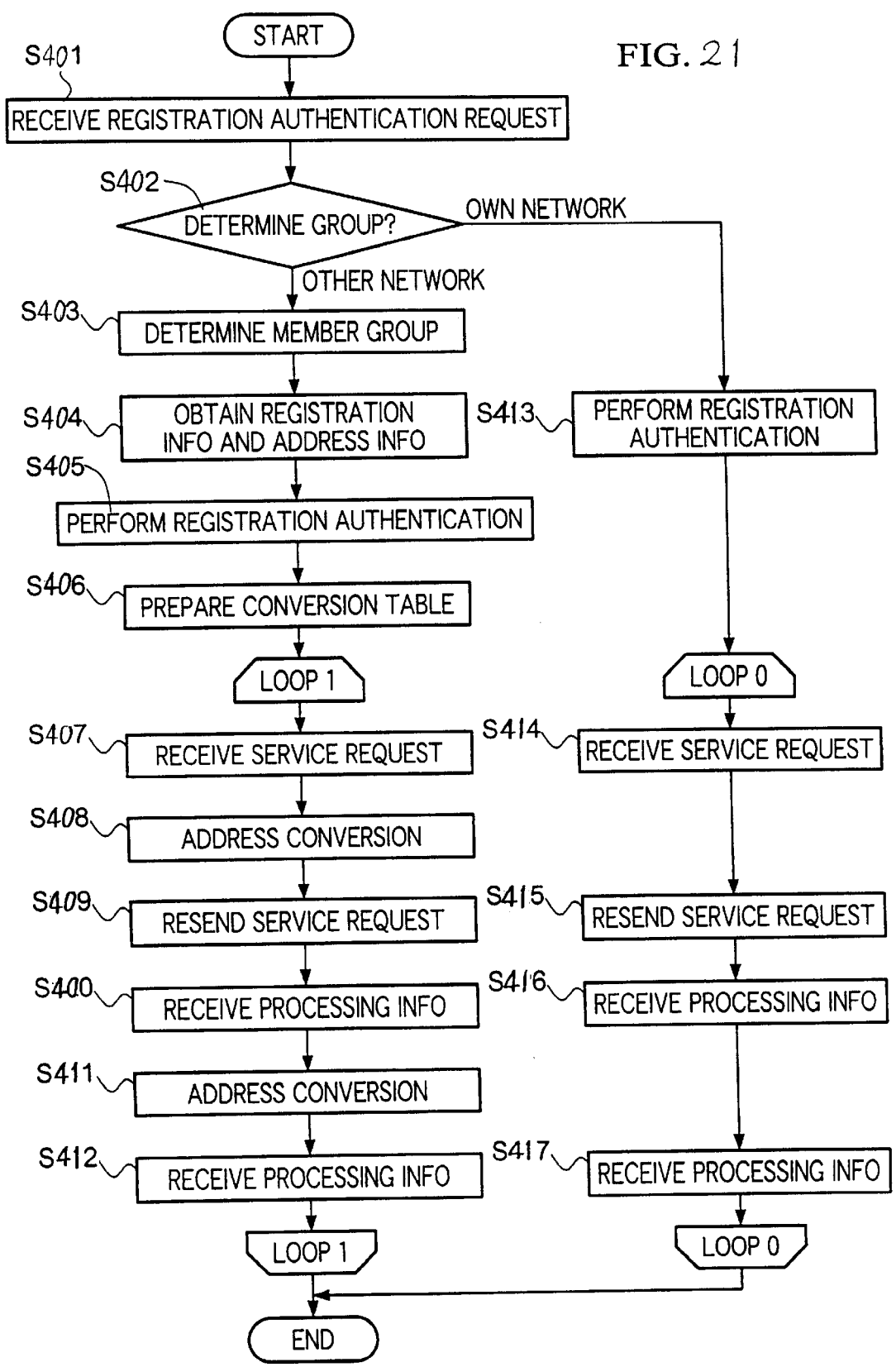
FIG. 21 a flowchart showing the operation of the radio server in Embodiment 7.

Next, the operation of the mobile terminal 403-2 comprised by a combination of the radio server 410-1 having the structure described in this embodiment and the mobile radio and mobile terminal will be explained with reference to FIGS. 20 and 21. FIG. 21 shows a flowchart of the radio server 401-n (n=1, 2, . . . ).

Here, the mobile terminal 403-2 is managed by the home radio server 401-2. Also, it is assumed that I/O device, display device (neither is shown) as peripheral devices or adjunct devices are connected to the mobile terminal 403-2. Here, I/O device refers to input devices such as keyboard, mouse and touch panel. Display device refers to CRT (cathode ray tube) and liquid crystal display devices.

First, the mobile terminal 403-2 accesses the radio server 401-1 by radio signals by way of the base station radio 402-1 to perform a registration authentication request accompanied by its registration authentication information, and the radio server 401-1 receives this request (step S401). At this time, the mobile terminal 403-2 does not recognize to which network it is accessing. Here, registration authentication information including a dedicated uniquely-defined identifier and the like assigned to the mobile terminal 403-2 may be sent.

The radio server 401-1, upon receiving the registration authentication information from the mobile terminal 403-2, the registration authentication section 414-1 judges, based on this registration authentication information, whether or not the mobile terminal 403-2 belongs to its own network (that is, whether it is under the management of the radio server 401-1) (step S402). Here, it is assumed that each radio server has some network-related information (IP address, port number and the like of the radio servers 401-n (n=1, 2, . . . ) belonging to each network) corresponding to the identification for each mobile terminal 403-n.

Because the mobile terminal 403-2 belongs to network 2, the registration authentication section 414-1 judges that it does not belong to its own network, and deduces from the network-related information that the mobile terminal 403-2 belongs to network 2 (step S403).

Then, the registration authentication section 414-1 accesses the home radio server 401-2 and receives registration authentication information for the mobile terminal 403-2 and IP address and further IP addresses and port numbers of various servers belonging to the network 2 (step S404).

The registration authentication section 414-1 performs registration authentication using the registration authentication information of the mobile terminal 403-2 obtained from the home radio server 401-2 (step S405). When the registration authentication process verifies that the access by the mobile terminal 403-2 is proper, a connection between the mobile terminal 403-2 and the radio server 401-1 is established. The registration authentication process carried out here is determined separately. One example is to perform the process by using the dedicated identifier of the mobile terminal 403-n included in the registration authentication information.

Figures 12, 22:
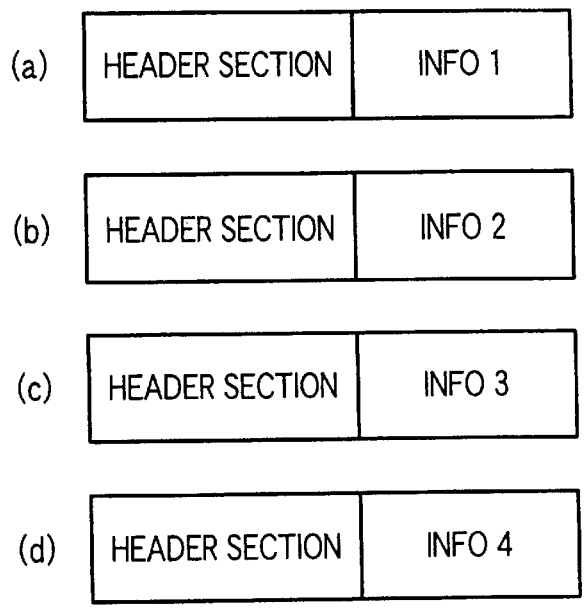
FIG. 12 is a diagram for explaining the format of another broadcasting information.
FIG. 22 is a diagram showing an example of the address conversion table.

Next, the address conversion section 416-1 correlating the IP address of the mobile terminal 403-2 received from the home radio server 401-2 and the IP addresses and port numbers of various servers such as DNS server, FTP server, HTTP server and the like belonging to network 2 with the IP addresses and port number of corresponding servers in network 1 (step S406). Here, an example of the address conversion table is shown in FIG. 22. In this example, the table is comprised by fields providing the IP addresses and port numbers under the management of home radio server and the IP address and the identifier number as an identification under the management of a radio server to which the mobile terminal has moved.

similar to the case of the mobile terminal 403-2 accessing servers in network 2, requests to the DNS server 404-2, HWT server 405-2, FTP server 406-2 are issued.

Next, the address conversion section 406-1 converts the IP addresses of the requested servers in network 2 to match the corresponding IP addresses in network 1 for such servers as DNS server 404-1, HTTP server 405-1, FTP server 406-1, according to the address conversion table stored in the memory section 412-1, which are used as destination addresses. Further, the address conversion section 406-1 converts the IP address of the mobile terminal 403-2 to a corresponding IP address in network 1, which is designated as the original sender address (step S408). Here, sometimes, port numbers are duplicated, and therefor, information on the requested function is also issued from the mobile terminal 403-2, and the address conversion section 406-1 may perform address conversion of IP addresses of the servers according to this function information.

Then, the converted IP address of the server and the service request including the IP address of the mobile terminal 403-2 forwarded from the mobile terminal 403-2 are sent to those servers in network 1 having the identical functions as those in the destination network (step S409).

A server receiving a service request sends a response including the result of processing requested and the IP address of the server as the original sender address and the IP address of the mobile terminal 403-2 as the destination address. The radio server 401-1 receives this response (step S410).

The address conversion section 403-1 converts the IP address included in the response as the original sender address of the responding server to the IP address of the corresponding server in network 2 according to the address conversion table. Further, the IP address of the mobile terminal 403-2 is converted to the IP address in network 2 (step S411).

Then, the radio server 401-1 sends the information to the mobile terminal 403-2 by radio signals by way of the base radio station 402-1 (step S412).

Subsequently, loop 1 is repeated, but it is assumed that when the mobile terminal 403-2 disconnects the contact with the radio server 401-1, the process is considered to be completed.

Next, the process will be described for the mobile terminal 403-1 belonging to network 1 to access the radio server 401-1 by way of the base station radio 402-1.

The mobile terminal 403-1 sends a registration authentication request to the radio server 401-1, which is accompanied by registration authentication information, and the radio server 401-1 receives this registration authentication request (step S401). Here, the dedicated identifier number of the mobile terminal 403-1 may be sent as registration authentication information.

The radio server 401-1, upon receiving the registration authentication information sent from the mobile terminal 403-1, judges whether or not the mobile terminal 403-2 belongs to own network or to network 1, according to the registration authentication information (that is, it is or is not under the management of radio server 401-1) (step S402).

Because the mobile terminal belongs to network 1, the registration authentication section 414-1 judges that the device is one of its own, and the registration authentication section 414-1 performs registration authentication process using the registration authentication information obtained from the mobile terminal 403-1 (step S413). If it is judged by this registration authentication process that the access by the mobile terminal 403-1 is proper, the connection between the mobile terminal 403-1 and the radio server 401-1 is established.

Next, service requests issued from the mobile terminal 403-1 to various type of servers are received by the radio server 401-1 via base station radio 402-1 (step S414).

Then, the IP address of the server to receive the request from the mobile terminal 403-1 and the service request including the IP address of the mobile terminal 403-1 are sent to the destination server (step S415).

Then, the server receiving the service request sends a response including the result of processing requested and the IP address of the server as the original sender address and the IP address of the mobile terminal 403-1 as the destination address. The radio server 401-1 receives this response. (step S416).

Then, the radio server 401-1 sends the information to the mobile terminal 403-1 by radio signals via the base radio station 402-1 (step S417).

Subsequently, loop 0 is repeated, but it is assumed that when the mobile terminal 403-1 disconnects the contact with the radio server 401-1, the process is considered to be completed.

The above description relates to a case of the mobile terminal 403-n not having own IP address and IP addresses and port numbers of the various servers. But, if the mobile terminal 403-n has own IP address and the IP addresses and port numbers of the various servers, in step S401, such information may be included in the registration authentication information included in the registration authentication request received by the radio server 401-1 so that the address conversion table may be produced according to this information.

As described above, the radio server 401-1 converts the IP addresses to various servers belonging to network 2 included in the service request, issued from the mobile terminal 403-2, to IP addresses of corresponding servers in network 1 and sends back the service request. Accordingly, the mobile terminal 403-2 can access any server belonging to network 1 having the identical functions as those in network 2, therefore, the mobile terminal 403-2 can receive any type of service from servers of the identical function in different networks using the environmental parameters used in own network 2.

Also, by using the address conversion table described above, transfer of service request to servers having such address conversion function is facilitated.

Also, an application program to perform the terminal-server connection may be recorded on a computer-readable recording medium, and the recorded program may be read by computer means to execute the process of connecting a terminal to any server in a radio server.

That is, this program enables the computer means to execute a function to identify a network that a mobile terminal belongs to, a function to detect the network that the mobile terminal belongs to, a function to obtain address information, and, using the address information issued from the mobile terminal, a function to convert a destination address of the information from the mobile terminal to an address of a function server connected to the radio server currently serving the mobile terminal and having the identical function as the function server in the network that the mobile terminal belongs to, and convert the address of the mobile terminal to a corresponding address in own network.

Further, this program, using the acquired address information, enables the computer means to execute a function to prepare an address conversion table correlating the addresses of own servers with servers having the identical function in other networks and correlating the addresses of the mobile terminals when they are in own network and when they are in other networks, and to perform address conversion of original sender addressees and destination addresses of information issued from the mobile terminals using the address conversion table.

As explained above, according to Embodiment 7, in response to a service request from a mobile terminal (a terminal device including a mobile radio) belonging to a different network, a radio server converts a destination address to an address of a server having an identical function in the network that manages the radio server that received the service request, and further converts an original sender address to a corresponding address in own network. Accordingly, there is no need to change the parameters of the terminal device, and, even if the terminal device moves among a plurality of networks, identical services can be received from function servers belonging to different networks.

It is further preferable that Embodiments 1, 2 be combined with Embodiment 7.

For example, when it is necessary for the mobile terminal to respond to a message received through a push-type information distribution service, a response message will be sent by way of a certain function server (PROXY server) in a home radio server. However, when the mobile terminal is operating in a network other than the network that it belongs to, the radio servers of this invention enables the message to be sent to a pseudo proxy server, in the current network of the mobile terminal, that corresponds to the proxy server in the home radio server. In this case, the pseudo proxy server within the radio server functions on behalf of the home proxy server. In other words, the port for sending the response to the push server is determined by referring to the table.

Therefore, the user can respond to a message sent by a push-type information distribution service without changing own terminal parameters regardless of whether the mobile terminal is connected to a home radio server or non-home radio server.

It should be noted that, in addition to application to the Internet, this invention can be utilized in other types of network such as LAN and dial-up networks.

Also, computer system, in this context, includes any operating systems (OS) and peripheral hardwares. Computer readable recording media include portable media such as floppy disks, opto-magnetic disks, ROM, CD-ROM, as well as fixed devices such as hard disks housed in computer systems. Computer-readable recording media include portable media such as floppy disks, opto-magnetic disks, ROM, CD-ROM, as well as fixed devices such as hard disks housed in computer systems. Computer-readable memory media further include short-term dynamic memories (transmission media inclusive of wave signals) used in transmitting applications through such means as networks such as Internet or telephone networks, as well as other short-term memories such as volatile memories used in servers and client computer systems. Application programs may perform a part of the described functions, or may be operated in conjunction with pre-recorded programs stored in computer systems to provide differential files (differential programs).

It should be noted that, although this invention has been explained in detail with reference to the drawings, specific structures are not limited to those presented in the embodiments, and includes designs encompassed by the essence of this invention.

What is claimed is:

1. A push-type function server operating in a radio communication system comprised by a plurality of radio servers connectable to the Internet; at least one type of a function server connected to said radio servers and connectable to the Internet; a radio base station connected to said radio server for radio communication; a mobile radio device for radio communication with the radio base station; and a terminal device connected to the mobile radio device; so that the terminal device can connect to the Internet by communication with the mobile radio device within an area managed by the radio base station connected to the radio server; wherein the push-type function server is comprised by:

an information accumulation section for accumulating information to be distributed to the terminal device and an identifier information for identifying the terminal device and a processing section; wherein the processing section is comprised by:

a mobile device address information acquiring section for acquiring address information of a mobile radio device connected to a destination terminal device from a home radio server that manages the mobile radio device according to the identifier information; and an information distribution section for distributing information to the radio server connected to the destination terminal device according to the address information.

2. An information monitoring device operating in a radio communication system comprised by a plurality of radio servers connectable to the Internet; at least one type of a function server connected to said radio servers and connectable to the Internet; a radio base station connected to said radio server for radio communication; a mobile radio device for radio communication with the radio base station; and a terminal device connected to the mobile radio device; so that the terminal device can connect to the Internet by communication with the mobile radio device within an area managed by the radio base station connected to the radio server; wherein the information monitoring device is comprised by:

an information monitoring section for detecting changes in information accumulated in other function servers; and an information transfer section for transferring a new piece of information in the accumulated information to the push-type function server according to claim 1.

3. An information monitoring device according to claim 2, wherein the information monitoring section is further provided with an information extraction section for building information to be transferred according to an amount/contents of information accumulated in other function servers; and the information transfer section transfers information built by the information extraction section.

4. A broadcasting terminal device for broadcasting identical information to computers and terminals connected to specified networks simultaneously, operating in the terminal device for receiving information from the push-type function server that receives the information from the information monitoring device according to claim 2, wherein the broadcasting terminal device attaches an identifier to identifier to indicate that said information is broadcasting information and a network addresses of a network to be broadcasted; and further distributes the information to the network indicated by said network address after classifying said information by the destination to which it is broadcast.

5. A terminal device for receiving information from the push-type function server that received the information from the information monitoring device according to claim 2 and for displaying for network broadcast information broadcasted after classified into each destination to be broadcasted, wherein the terminal device is comprised by:

a broadcast information receiving section for receiving broadcast information and establishing communication with a computer server by communicating with a radio base station connected to the computer server by radio communication;

a broadcast level defining section defined with a broadcast level, corresponding to the terminal device, of the broadcast levels classified into each destination to be broadcasted; and a broadcast information extraction section for extracting from the broadcast information received only the information necessary for the terminal device according to the broadcast level.

6. A computer server operating in the push-type function server that receives information from the information monitoring device according to claim 2, for distributing the broadcast information to terminal devices under own control after receiving broadcast information classified into each destination to be broadcasted, wherein the computer server is further comprised by:

a broadcast information receiving section for receiving broadcast information;

a broadcast level defining section defined with a broadcast level corresponding to the terminal device connected to the compute server of broadcast level classified into each destination to be broadcasted;

a broadcast information reconstruction section for reconstructing received broadcast information for each broadcast level according to said broadcast level; and a radio base station; wherein radio communication with the terminal device is established via the radio base station, and the broadcast information reconstructed in the broadcast information reconstruction section is distributed to the terminal device.

7. A radio server operating in a radio communication system comprised by a plurality of radio servers connectable to the Internet; at least one type of function server connected to the radio server, a base station radio connected to the radio server for radio communication with the radio server; a mobile radio for radio communication with the base station radio; and a terminal device connected to the mobile radio; so that the mobile terminal can be connected to the Internet by radio communication with the mobile radio within a district under control of the base station radio connected to the radio server, wherein the radio server includes:

an address conversion section for responding to a service request issued from a terminal device controlled by other radio server connected to the push-type function server that receives information from the information monitoring device, according to claim 2, and converting a destination address included in the service request to an address of a function server connected to the radio server and having an identical function as the push-type function server, and converting the address of the terminal device to a corresponding address in own network.

8. A computer-readable recording medium containing a push-type program for the information monitoring device according to claim 3, including the steps of:

detecting changes in information accumulated in other function servers;

building information to be transferred in accordance with the volume/content of the information; and transferring the built information.

9. A computer-readable recording medium containing a push-type program for the information monitoring device according to claim 3, comprising the steps of;

detecting changes in information accumulated in other function servers;

building information to be transferred in accordance with the volume/content of the information; and transferring the built information.

10. A broadcasting terminal device in said terminal device which is distributed information by the push-type function server according to claim 1, said broadcasting terminal device for simultaneously distributing identical information to computers and terminals connected to specified networks, wherein the broadcasting terminal device attaches an identifier to identifier to indicate that said information is broadcasting information and a network addresses of a network to be broadcasted; and further distributes the information to the network indicated by said network address after classifying said information by the destination to which it is broadcast.

11. A terminal device for receiving information distributed by the push-type function server according to claim 1 and displaying broadcasting information broadcasted after classifying the broadcasting information into each destination to be broadcasted, wherein the terminal device is comprised by:

a broadcast information receiving section for receiving broadcast information and establishing communication with a computer server by communicating with a radio base station connected to the computer server by radio communication;

a broadcast level defining section defined with a broadcast level, corresponding to the terminal device, of the broadcast levels classified into each destination to be broadcasted; and a broadcast information extraction section for extracting from the broadcast information received only the information necessary for the terminal device according to the broadcast level.

12. A method for communication based on the push-type function server according to claim 1 and the terminal device according to claim 11, including the steps of:

in the push-type function server, acquiring address information from a home radio server that manages a mobile radio connected to the destination terminal device, based on the identifier information; and transferring distribution information to a radio server connected to the destination terminal device, based on the address information; and in the terminal device, receiving broadcast information;

extracting information necessary only to the terminal device from the broadcast information received, by referring to contents defined in a broadcast level defining section; and displaying only the information extracted from the broadcast information.

13. A computer server operating in the push-type function server according to claim 1 for receiving broadcast information classified into each destination to be broadcasted and distributing to terminal devices that are under own control; wherein the computer server is further comprised by:

a broadcast information receiving section for receiving broadcast information;

a broadcast level defining section defined with a broadcast level corresponding to the terminal device connected to the compute server of broadcast level classified into each destination to be broadcasted;

a broadcast information reconstruction section for reconstructing received broadcast information for each broadcast level according to said broadcast level; and a radio base station; wherein radio communication with the terminal device is established via the radio base station, and the broadcast information reconstructed in the broadcast information reconstruction section is distributed to the terminal device.

14. A network address conversion device for converting an original sender address or a destination address included in data exchanged between a mobile terminal operating in a radio communication network and the push-type function server, according to claim 1, connected to the Internet, said radio communication network comprised by subnetworks, each of which includes at least one mobile terminal and radio server connected to the mobile terminal by radio communication, said mobile radios being mobile among the plurality of subnetwork, and each radio server, serving as a home radio server for mobile terminal, stores and manages Internet IP addresses of radio servers managing subnetwork which said mobile terminals exists; wherein the network address conversion device is provided in each radio server, and, in response to receiving a location identifier of a specific mobile terminal from the push-type function server to a home server of the specific mobile terminal, the network address conversion device notifies an Internet IP address of radio server managing a subnetwork currently in which the specific mobile terminal exists to the push-type function server; and, in response to receiving an Internet IP address allocation request from the push-type function server, the network address conversion device allocates an Internet IP address to the specific mobile terminal and notifies the push-type function server of the allocated Internet IP address; and in response to receiving data addressed to the allocated Internet IP address as its destination Internet IP address, the network address conversion device converts the destination address of the received data to a local address within the subnetwork in which the mobile terminal is currently operating.

15. A network address conversion device for an original sender address or a destination address included in data exchanged between a mobile terminal and the push-type function server, according to claim 1, operating in a radio communication network, connected to the Internet, comprised by subnetworks, each of which includes at least one mobile terminal and one radio server connected to the mobile terminal by radio communication in such a way that mobile radios are free to operate within any subnetwork and each radio server serving as a home radio server stores and manages Internet IP addresses of radio servers managing mobile terminals that are currently operating in the subnetworks; wherein the network address conversion device is provided in each radio server, and, each network address conversion device is comprised by:

a data analysis section for receiving the data exchanged between the mobile terminal and the push-type server connected to the Internet and analyzing a type, original sender and destination;

a current location search/notify section for finding, when the data analysis section judges that the received data is a location identifier for a specific mobile terminal sent from the push-type function server, an Internet IP address of a subnetwork in which the specific mobile terminal is operating and an Internet IP address of a radio server under which the mobile terminal is currently operating, by searching through Internet IP addresses of individual mobile terminals stored in respective radio servers and of radio servers managing subnetworks that mobile terminals belong, and sending a searched Internet IP address to the original sender of the inquiry signal;

an Internet IP address allocation section for allocating one Internet IP address chosen from a plurality of Internet IP addresses to the mobile terminal requesting an Internet IP addresses using the Internet IP addresses allocation request signal, when the data analysis section indicates that the received data is an Internet IP addresses allocation request sent from the push-type function server;

an address conversion table preparation section for matching an address of a mobile radio in a subnetworks to which the mobile radio belongs and an Internet IP address allocated to the mobile terminal and storing the matched addresses in an address conversion table for each allocation of an Internet IP address to a mobile terminal by the IP address allocation section;

an address conversion section for sending the allocated Internet IP address to the original sender of the Internet IP address request signal, for each allocation of an Internet IP address to a mobile terminal, and for converting the destination Internet IP address of the data to an address within the necessary subnetwork corresponding to the destination Internet IP address by referring to the address conversion table, when it is judged by the data analysis section that the received data is to be delivered to the mobile terminal having the allocated Internet IP address.

16. A network address conversion device for converting an original sender address or a destination address included in data exchanged between a mobile terminal and the push-type function server, according to claim 1, operating in a radio communication network, connected to the Internet, comprised by subnetworks, each of which includes at least one mobile terminal and one radio server connected to the mobile terminal by radio communication in such a way that mobile radios are free to operate within any subnetwork and each radio server serving as a home radio server stores and manages Internet IP addresses of radio servers managing mobile terminals that are currently operating in the subnetworks; wherein the network address conversion device is provided in each radio server, and, in response to receiving a location identifier from the push-type function server addressed to a specific home radio server of a specific mobile terminal, the network address conversion device notifies an Internet IP address of a subnetwork currently managing the mobile terminal to the push-type function server; and, in response to receiving an Internet IP address allocation request from the push-type function server, the network address conversion device allocates an Internet IP address to the specific mobile terminal and notifies the push-type function server of the Internet IP address; and in response to receiving data addressed to the Internet IP address as its destination address, the network address conversion device converts a destination address of the received data to a local address within a subnetwork in which the mobile terminal is currently operating.

17. A network address conversion device for converting an original sender address or a destination address included in data exchanged between a mobile terminal and the push-type function server, according to claim 1, operating in a radio communication network, connected to the Internet, comprised by subnetworks, each of which includes at least one mobile terminal and one radio server connected to the mobile terminal by radio communication in such a way that mobile radios are free to operate within any subnetwork and each radio server serving as a home radio server stores and manages Internet IP addresses of radio servers managing mobile terminals that are currently operating in the subnetworks; wherein the network address conversion device is provided in each radio server, and, each network address conversion device is comprised by:

a data analysis section for receiving data exchanged between the mobile terminal and the push-type server connected to the Internet and analyzing a type, original sender and destination;

a current location search/notify section for finding, when the data analysis section judges that the received data is a location identifier for a specific mobile terminal sent from the push-type function server, an Internet IP address of a subnetwork in which the specific mobile terminal is operating and an Internet IP address of a radio server under which the mobile terminal is currently operating, by searching through Internet IP addresses of individual mobile terminals stored in respective radio servers and of radio servers managing subnetworks that mobile terminals belong, and sending a searched Internet IP address to the original sender of the inquiry signal;

an Internet IP address allocation section for allocating one Internet IP address chosen from a plurality of Internet IP addresses to the mobile terminal requesting an Internet IP addresses by the Internet IP addresses allocation request signal, when the data analysis section indicates that the received data is an Internet IP addresses allocation request sent from the push-type function server;

an address conversion table preparation section for matching an address of a mobile radio in a subnetworks to which the mobile radio belongs and an Internet IP address allocated to the mobile terminal and storing the matched addresses in an address conversion table for each allocation of an Internet IP address to a mobile terminal by the IP address allocation section;

an address conversion section for sending the allocated Internet IP address to the original sender of the Internet IP address request signal, for each allocation of an Internet IP address to a mobile terminal:, and for converting a destination Internet IP address of the data to an address within the necessary subnetwork corresponding to the destination Internet IP address by referring to the address conversion table, when it is judged by the data analysis section that the received data is to be delivered to the mobile terminal having the allocated Internet IP address as the destination address.

18. A radio server in a radio communication system comprised by a plurality of radio servers connectable to the Internet; at least one type of function server connected to the radio server, a base station radio connected to the radio server for radio communication with the radio server; a mobile radio for radio communication with the base station radio; and a terminal device connected to the mobile radio; so that the mobile terminal can be connected to the Internet by radio communication with the mobile radio within a district under control of the base station radio connected to the radio server, wherein the radio server includes:

an address conversion section for responding to a service request issued from a terminal device controlled by other radio server connected to the push-type function server, according to claim 1, and converting a destination address included in the service request to an address of a function server connected to the radio server and having an identical function as the push-type function server, and converting the address of the terminal device to a corresponding address in own network.

19. A method for push-type control of the push-type function server according to claim 1, including the steps of:

acquiring address information of a mobile radio connected to a destination terminal device from a radio server that manages the mobile radio, based on the identifier information; and transferring distribution information to a radio server connected to the destination terminal device according to the address information.

20. A computer-readable recording medium containing a push-type program for the push-type function server according to claim 1, comprising the steps of;

acquiring address information from a home radio server that manages a mobile radio connected to the destination terminal device, based on the identifier information; and transferring distribution information to a radio server connected to the destination terminal device, based on the address information.

* * * * *

UNITED STATES PATENT AND TRADEMARK OFFICE
CERTIFICATE OF CORRECTION

PATENT NO. : 6,704,295 B1
DATED : March 9, 2004
INVENTOR(S) : Tari et al.

It is certified that error appears in the above-identified patent and that said Letters Patent is hereby corrected as shown below:

<u>Title page,</u>
Item [75], Inventors, should read:

-- [75] Inventors: Kazuyoshi Tari, Omiya (JP); Hiroyuki Unoki, Omiya (JP); Tumoru Nagira, Omiya (JP) --

Signed and Sealed this

Seventeenth Day of August, 2004

JON W. DUDAS
*Acting Director of the United States Patent and Trademark Office*